US010524406B2

United States Patent
(12) United States Patent
Potier et al.

(10) Patent No.: US 10,524,406 B2
(45) Date of Patent: Jan. 7, 2020

(54) AGRICULTURAL HITCH WITH A SYSTEM FOR MANAGEMENT AND GUIDANCE OF OPERATIONS AND A METHOD THEREOF

(71) Applicant: KUHN SA, Saverne (FR)

(72) Inventors: Philippe Potier, Zittersheim (FR); Andrii Yatskul, Strasbourg (FR); Jean-Pierre Lemiere, Dijon (FR)

(73) Assignee: KUHN SA, Saverne (FR)

(*) Notice: Subject to any disclaimer, the term of this patent is extended or adjusted under 35 U.S.C. 154(b) by 136 days.

(21) Appl. No.: 15/299,629

(22) Filed: Oct. 21, 2016

(65) Prior Publication Data

US 2017/0188505 A1 Jul. 6, 2017

(30) Foreign Application Priority Data

Nov. 3, 2015 (FR) ..................................... 15 60524

(51) Int. Cl.
*A01B 69/00* (2006.01)
*A01B 79/00* (2006.01)
(Continued)

(52) U.S. Cl.
CPC .......... *A01B 69/004* (2013.01); *A01B 59/002* (2013.01); *A01B 69/003* (2013.01);
(Continued)

(58) Field of Classification Search
None
See application file for complete search history.

(56) References Cited

U.S. PATENT DOCUMENTS 5,558,350 A * 9/1996 Kimbrough .............. B60D 1/06 280/426
6,434,462 B1 * 8/2002 Bevly .................. A01B 69/008 701/41

(Continued)

FOREIGN PATENT DOCUMENTS

EP 1 088 743 A1 4/2001
EP 1 327 570 A1 7/2003
EP 1 772 350 A1 4/2007

OTHER PUBLICATIONS

French Preliminary Search Report dated Jun. 22, 2016 in French Application 15 60524, filed on Nov. 3, 2015 ( with English Translation of Categories of Cited Documents and Written Opinion).

*Primary Examiner* — David P. Merlino
(74) *Attorney, Agent, or Firm* — Oblon, McClelland, Maier & Neustadt, L.L.P.

(57) ABSTRACT

An agricultural hitch with a system for management and guidance of maneuvers and a method employed by the hitch is provided. The hitch includes a tractor, an agricultural machine hitched by an articulated linkage, and a system for management and guidance of maneuvers, provided with a computing and control unit. The computing and control unit or of the hitched agricultural machine constitutes the master unit of the system for management and guidance of maneuvers, and is adapted to compute a set path for a maneuver to come, by employing an algorithm for prediction of paths and an algorithm for optimization of path settings, and to automatically execute the maneuver or of assisting in semiautomatic execution of the maneuver by steering the tractor and by recording, during maneuvering, the differences between the predefined set path and the real or currently estimated path.

17 Claims, 11 Drawing Sheets

(51) Int. Cl.

| | |
|---|---|
| ***B62D 13/00*** | (2006.01) |
| ***A01B 59/00*** | (2006.01) |
| ***G05D 1/02*** | (2006.01) |
| *A01B 59/042* | (2006.01) |

(52) U.S. Cl.

CPC ............ *A01B 79/005* (2013.01); *B62D 13/00* (2013.01); *G05D 1/0221* (2013.01); *A01B 59/042* (2013.01); *G05D 2201/0201* (2013.01)

(56) References Cited

U.S. PATENT DOCUMENTS 6,490,539 B1 * 12/2002 Dickson ............... A01B 69/008 701/23
7,225,891 B2 * 6/2007 Gehring ................. B62D 13/06 701/41
7,798,263 B2 * 9/2010 Tandy, Jr. ............. B60T 8/1708 701/1
2003/0167107 A1 * 9/2003 Guesdon ................ B62D 13/04 701/1
2004/0017285 A1 * 1/2004 Zielinski .................. B60D 1/36 340/431
2006/0041354 A1 * 2/2006 Schick ................. A01B 69/008 701/41
2006/0142936 A1 * 6/2006 Dix ...................... A01B 69/008 701/50
2010/0018726 A1 * 1/2010 Chiocco ............... A01B 69/008 172/1
2010/0256871 A1 10/2010 Mitchell
2011/0231061 A1 * 9/2011 Reeve .................. A01B 69/008 701/41
2012/0296529 A1 * 11/2012 Peake .................. A01B 69/008 701/50
2014/0277675 A1 * 9/2014 Anderson .............. A01B 69/00 700/114
2015/0051795 A1 * 2/2015 Keys, II ................. B60D 1/248 701/41
2016/0129939 A1 * 5/2016 Singh ..................... B62D 13/06 701/41

* cited by examiner

AGRICULTURAL HITCH WITH A SYSTEM FOR MANAGEMENT AND GUIDANCE OF OPERATIONS AND A METHOD THEREOF

BACKGROUND OF THE INVENTION

Field of the Invention

The present invention relates to the field of agricultural machinery and more particularly to that of the design, construction and employment of agricultural equipment intended to achieve the maneuvers and operations necessary for cultivation of plant production.

The subject of the invention is more particularly an agricultural hitch capable of achieving maneuvers automatically or semi-automatically, as well as a method for automated or semiautomated management and guidance of such maneuvers.

To accomplish the diverse agricultural tasks, it is usual to use agricultural machines powered and driven by tractors. These tractors are associated with carried tools or with semi-carried machines, or else with a certain number of towed machines.

Such tractor-machine(s) or tractor-tool(s) assembly is referred to generally and in the present case as agricultural hitch, or else motorized or mechanized agricultural hitch.

In particular, within the scope of the present invention, the objective is to apply a system and a method for management and guidance of repetitive maneuvers in the case of a tractor-tools assembly provided preferably with up to four hitched operational components (including the tractor). The half-turns at the end of the field constitute a preferred but non-limitative example of the maneuvers concerned by the present invention.

Description of the Related Art

The advent of mechanization in agriculture since the beginning of the 20th century led to the use of progressively more powerful, faster and larger hitches of tractor+machine(s). This phenomenon had as a consequence the need to progressively automate their functioning, at least partly, since exclusively human control was becoming increasingly haphazard. The field of agricultural machinery has therefore been the subject of numerous technological innovations relating to its automation, mainly by virtue of the use of electronic technologies, then of on-board electronic systems.

At present, by means of the system of the Müller Elektronik Company known as the "Headland Management System", it is possible to record and to reproduce repetitive tasks (change of speed, deactivation or activation of the power take-off of the tractor, raising or lowering of the hitch, etc.) upon arrival at the end of the field. On the other hand, the half-turn maneuver is generally always managed by a driver. The driver follows an approximate path, while allowing for the width and turning radius of the agricultural machine (or of the hitch assembly). To the extent of repeated use of the same combination of tractor and hitched (or semi-carried) machine, the operator will be in better control of the maneuver and will empirically optimize the path being followed and the speed of the maneuver. As is known, the maneuvering times (especially at the end of the field) prolong the duration of a jobsite, since the machine is not productive during the half-turns.

U.S. Pat. Nos. 8,131,432B2 and 8,346,443B2 propose a method and a system for managing the half-turn of a vehicle by imposing limits on the work area. The tractor steers itself during the half-turns and thus controls the hitched machine.

The obligatory prerequisites for the solutions disclosed in these patents are:

- to provide the limits of the parcel being worked,
- to indicate the potential obstacles,
- to define the dimensions and parameters of the tractor (normally already present in the control module of the tractor),
- to define the dimensions and parameters of each hitched machine,
- to geolocate the agricultural machines precisely by a system of GPS type.

The teaching of these two documents corresponds to the steering control system known by the designation "iTEC Pro" ("Intelligent Total Equipment Control"—"Total intelligent control of the equipment") of the John DEERE Company. This system is automated, but it is still necessary to indicate the direction in which the tractor must turn (to the right or left).

It is also known how to use automatic management of half-turns on combine harvesters. On such a motor vehicle, the working implements used (such as the cutter bar, for example) are directly mounted on the motor vehicle and are easily controllable in position. The current systems of this type (for example that known by the designation "GPS PILOT FLEX") necessitate the use of geolocating systems in order to function.

Consequently, according to the existing prior art, the half-turn at the end of the field can be accomplished according to the following types of methods:

1. Manual guidance (most widely used method). The driver estimates the usable space "by eye" and tries "to fit" the path of the tractor-tools assembly into this space.

2. Autoguidance by learning. This guidance system records a typical path followed by the operator and repeats this path.

3. Automated half-turn, assisted by a geolocating device of GPS type (the user is required to enter the geometry of the tractor-tools assembly and the turning direction).

Thus it results from the foregoing that automated guidance of agricultural tools during half-turns is a known method, but only in certain configurations, such as presented, for example, in: U.S. Pat. No. 8,346,443B2, U.S. Pat. No. 8,577,558B2, EP 2659759A1, US 2013/0289883A1, US 2012/0185139A1, US 2005/0015189A1.

In all of these known solutions, the automatic guidance of the maneuvers is steered by the tractor (which if necessary integrates an additional electronic unit integrated in it), and it necessarily uses an external geolocating system.

Both manual operation and the known automated solutions have, in their practical use, inconveniences and limitations that must be overcome.

Thus manual operation of assemblies containing towed tools constitutes a difficult and complex task, requiring that the driver be attentive and vigilant at all times. The expansion of the working width (for example in the case of harvesters, seeders and sprayers) and the increase in the number of hauled elements as well as the increase in working speed in the field are making the operation of such equipment progressively more complicated and accident-prone. The most sensitive aspect concerns in particular maneuvers at the end of the field, such as half-turns. As an example, the drivers or operators are forced to reduce the forward speed and to counter-steer in order to compensate for the poor maneuverability of large machines, all while fitting the mobile assembly into a reduced maneuvering zone at the end of the field (headland). Studies made in the field show that close to 20% of the working time may be lost during maneuvers at the end of the field. In addition, the soil of the headland zone is more compacted because of the maneuvers taking place there, and this reduces the harvest yield. The width of headlands must therefore be reduced to the minimum, but this complicates the strategy for establishing maneuvering paths. It is difficult for a human operator to take all of these parameters into account in order to determine a path at the moment when he is executing the maneuver.

The known automated solutions, based on on-board intelligence at the level of the tractor, also have their negative aspects.

Thus, when it is the tractor that manages the half-turn of a hitched tractor-tools assembly, the user must indicate a large number of data pertaining to the hitched (or semi-carried) elements so that the tractor will be capable of executing the half-turn in automatic mode. Effectively, it is the hitched (or semi-carried) equipment that embodies the most design variants and adjustment parameters for achieving the desired technical operations. A data-acquisition operation must therefore be implemented upon each change of machine and for each new machine, which is tedious, a source of errors and time-consuming.

In the case of takeover of control by the tractor, the current systems necessitate geolocation of the tractor and in general of the towed elements also. Such equipment is costly and may undergo drifts, especially in the case of large parcels (due to the imperfect sphericity of the Earth). In addition, the procedure for obtaining paths in the case of the known solutions is not optimized: the established path is initially that of the tractor, whereas the important factor for the agricultural operation to be executed is the positioning and the path of the towed or semi-carried working tools, which are generally the broadest elements (and therefore the least maneuverable).

Finally, in these known automatic systems, it is the path of the tractor that is controlled, as well as the absence of contact between the tractor and the first hitched machine, by the control of the distance between them. Thus, in the case of half-turns, the positioning of the machines or tools at the exit and entrance of the working zone, which constitute the most important parameters, is not controlled and even more so is not guaranteed.

BRIEF SUMMARY OF THE INVENTION

The invention aims in particular at overcoming at least the major inconveniences alluded to in the foregoing.

Taking into account the limitations of existing systems outlined hereinabove, the main goals of the invention are the following:

- to provide a semiautomatic or automatic system for management and guidance of maneuvers (including the half-turns at the end of the field) of an assembly of tractor and hitched machines in order that these maneuvers will be executed efficiently, quickly, safely and reliable,
- to make the jobsites more performing in terms of speed, energy costs or soil protection (especially in the headlands).

Thus the present invention has the objective of providing a system capable of managing maneuvers entirely automatically or semiautomatically, especially half-turns, which is independent of the tractor, can be used with tractors whether or not they have on-board intelligence that is capable of managing half-turn maneuvers, with prediction of paths for motorized agricultural hitches provided non-preferentially with one, two or three operational component(s) hitched to a tractor.

To this end, the object of the invention is a hitch comprising, as constitutive operational components, a tractor and at least one towed or semi-carried agricultural machine, hitched directly to the said tractor or to a preceding machine in the hitch by at least one articulated linkage, said hitch also comprising a system for management and guidance of maneuvers, especially half-turns, provided with at least one computing and control unit, which is integrated with the or with one of the hitched machine(s) and which is connected on the one hand to at least one sensor informing it about the current mutual relative positions of the two components of each pair of operational components of the hitch connected to one another by an articulated linkage, and on the other hand to a unit for management and control of the tractor and/or to an interface for communication, especially for display and if necessary for control, with the driver and, finally, to at least one means for parameter assignment or programming, these additional functional components, to which the aforesaid computing and control unit is connected, also constituting part of the system for management and guidance of maneuvers.

This hitch is characterized in that the computing and control unit of the or of one of the hitched agricultural machine(s) constitutes the master unit of the system for management and guidance of maneuvers and preferably of the hitch, and in that it is capable of and designed for, under the control of an adapted program for management of maneuvers:

on the one hand, computing a set path for at least one maneuver to come, initiated automatically or by the driver, and doing so on the basis of preprogrammed parameters relating to the characteristics and physical variables of the tractor and of the or of hitched machine(s), to objectives and/or constraints related to the agricultural work to be executed and to the ground to be treated and to operating options of the hitch, and by employing an algorithm for prediction of paths and an algorithm for optimization of path settings and, on the other hand, automatically executing the said maneuver or assisting in semiautomatic execution of the said maneuver, and if necessary doing so in repeated manner, by steering the tractor, directly or by way of the management and control unit of this latter, and by recording, in the course of maneuvering, the differences between the predefined set path and the real or currently estimated path, in order to correct them automatically or in order to signal them to the driver in semiautomatic mode, possibly after computation, by way of an adapted algorithm, of maneuvers for corrections of the path to be followed.

The invention also relates to a method for automated or semiautomated management of maneuvers, especially of half-turns, of an articulated or multi-articulated hitch comprising a tractor and at least one towed or semi-carried agricultural machine, hitched directly to the said tractor or to a preceding machine in the hitch by at least one articulated linkage as well as a system or management and guidance of maneuvers, especially half-turns, provided with a computing and control unit, which is integrated with the or with one of the hitched machines(s) and which is connected on the one hand to at least one sensor informing it about the current mutual relative positions of the two components of each pair of operational components of the hitch connected to one another by an articulated linkage, and on the other hand to a unit for management and control of the tractor and/or to an interface for communication, especially for display and if necessary for control, with the driver and, finally, with at least one means for parameter assignment or programming, these additional functional components also constituting part of the system for management and guidance of maneuvers.

This method is characterized in that it consists, by way of the computing and control unit of the agricultural machine in question, acting as master unit of the system for management and guidance of maneuvers of the hitch and, by execution of an adapted program for management of maneuvers, of computing a set path for at least one maneuver to come, initiated automatically or by the driver, and doing so on the basis of preprogrammed parameters relating to the constructive, functional and dimensional characteristics of the tractor and of the hitched machine(s), to objectives and/or constraint(s) related to the agricultural work to be executed and to the ground to be treated and to functioning options of the hitch and by employing an algorithm for prediction of paths and an algorithm for optimization of path settings, then in automatically executing the said maneuver or in assisting in semiautomatic execution of the said maneuver, and if necessary doing so in repeated manner, by steering the tractor, directly or by way of its management and control unit of this latter, and by recording, in the course of maneuvering, the differences between the set predefined path and the real or currently estimated path, in order to correct them automatically or in order to signal them to the driver in semiautomatic mode, possibly after computation, by employment of an adapted algorithm, of actions for correction of the path to be followed.

BRIEF DESCRIPTION OF THE SEVERAL VIEWS OF THE DRAWINGS

The invention will be better understood, by virtue of the description hereinafter, which relates to preferred embodiments, given by way of non-limitative examples, and explained with reference to the attached schematic drawings, wherein.

DETAILED DESCRIPTION OF THE INVENTION

Figure 1A:
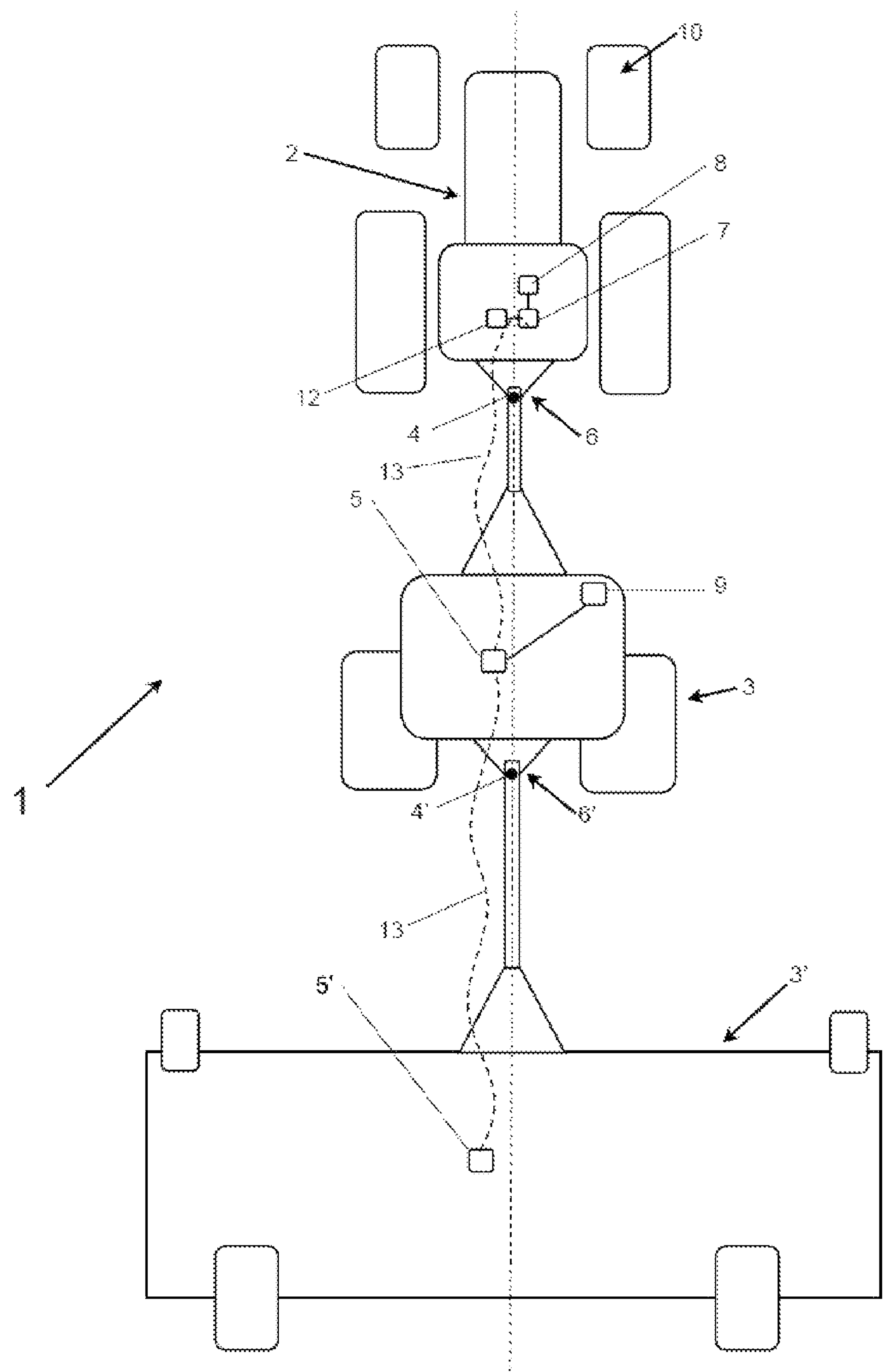
FIGS. 1A and 1B are schematic representations from above of a hitch according to the invention comprising respectively three elements (tractor+two operational components) and four elements (tractor+three operational components) and equipped with a system for management and guidance of maneuvers.
Figure 1B:
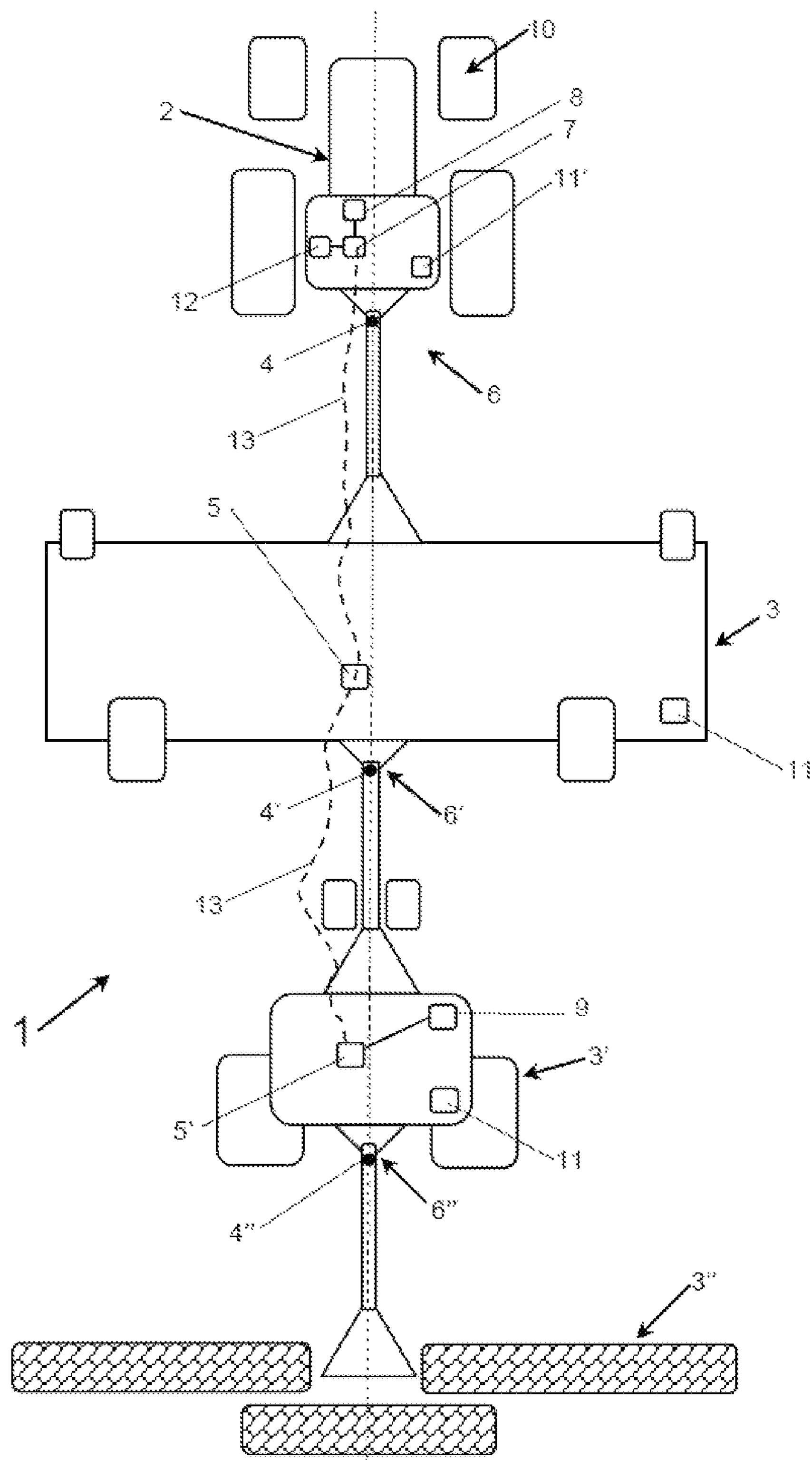
Figure 2:
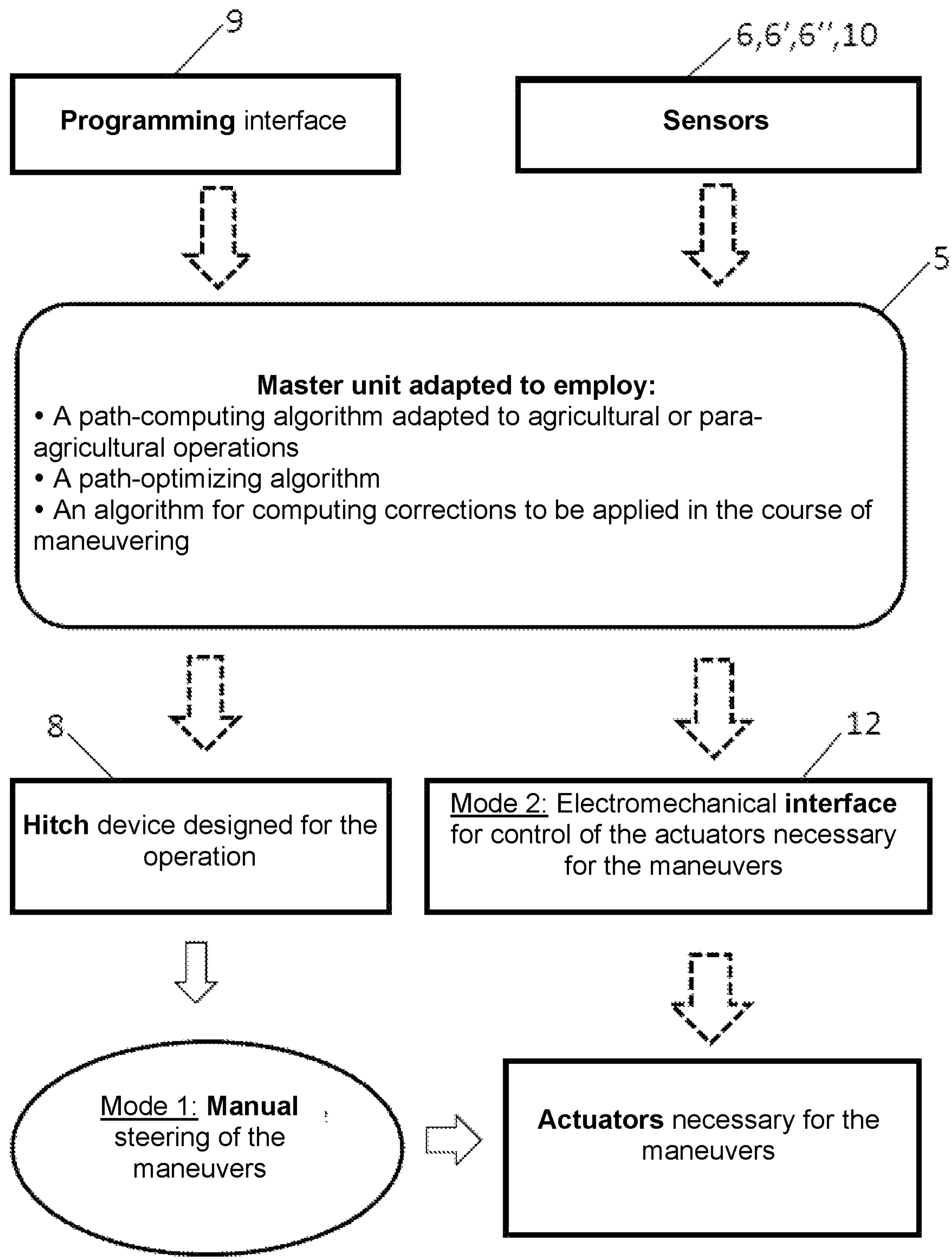
FIG. 2 is an overall block diagram illustrating the flow and processing of information and instructions in the system for management and guidance of maneuvers according to the invention as a function of the steering mode (mode 1: semiautomatic steering, mode 2: automatic steering)
Figure 3:
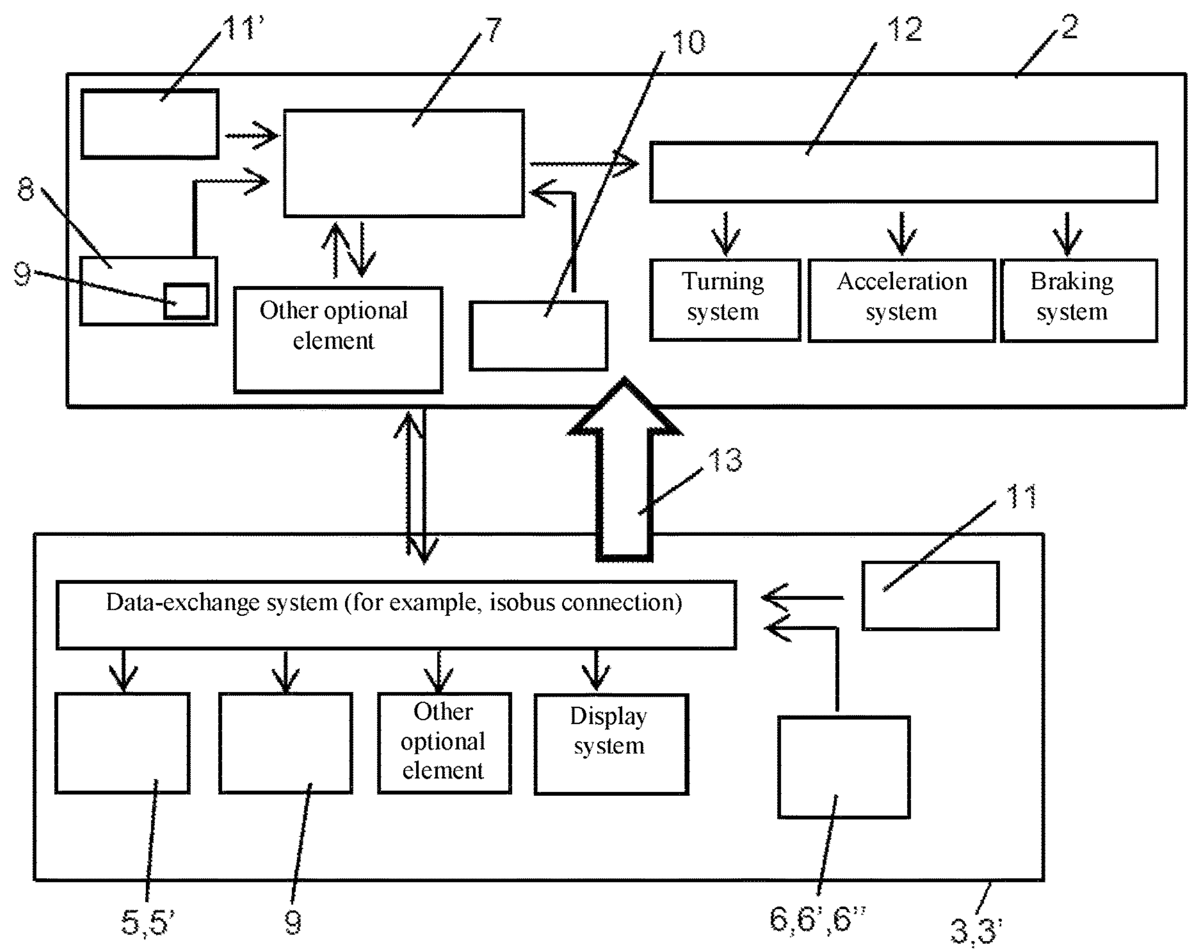
FIG. 3 is a detailed block diagram illustrating the main functional elements making up the system for management and guidance of maneuvers according to the invention and their mutual exchanges.
Figure 4:
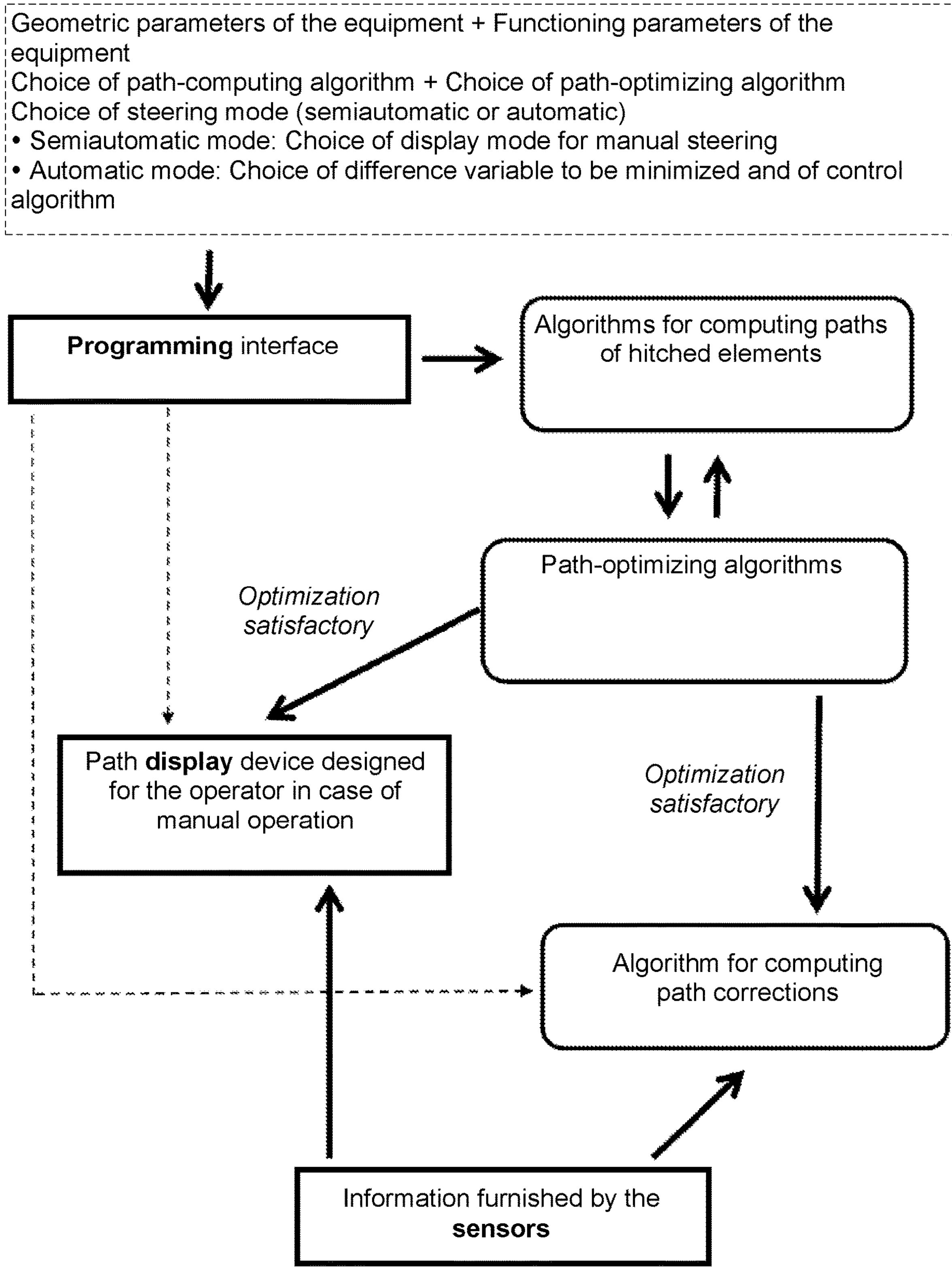
FIG. 4 is a functional block diagram illustrating the possible interactions between the algorithms employed by the master unit and the communication interfaces within the scope of the system for management and guidance of maneuvers.

FIGS. 1A and 1B, especially in conjunction with FIG. 3, show a hitch 1 comprising, as constitutive operational components, a tractor 2 and at least one towed or semi-carried agricultural machine 3, 3', 3", hitched directly to the said tractor or to a preceding machine 3, 3' in the hitch by at least one articulated linkage 4, 4', 4". This hitch 1 also comprises a system for management and guidance of maneuvers, especially half-turns, provided with at least one computing and control unit 5, 5', which is integrated in the or in one of the hitched machine(s) 3, 3', 3" and which is connected on the one hand to at least one sensor 6, 6', 6" informing it about the current mutual relevant positions of the two components 2, 3; 3, 3; 3' 3" of each pair of operational components 3, 3', 3" of hitch 1 connected to one another by an articulated linkage 4, 4', 4", on the other hand to a unit 7 for management and control of tractor 2 and/or to an interface 8 for communication, especially for display and possibly for control, with the driver and, finally, to at least one means 9 for parameter assignment or programming, these additional functional components 6, 6', 6", 7, 8, 9 (comprising the said at least one sensor 6, 6', 6", unit 7 and/or interface 8 and the said at least one means 9 for parameter assignment or programming), to which the aforesaid unit 5, 5' for computing and control is connected, also making up part of the system for management and guidance of maneuvers.

Communication interface 8, for example in the form or a touch screen or analogous device, is preferably disposed, if necessary in displaceable and or removable relationship, in tractor cab 2. A means 9 for parameter assignment and/or programming is mounted on machine 3 provided with master unit 5 of hitch 1, or may be connected temporarily to this latter. Alternatively, this means 9 for parameter assignment and/or programming may also be present in the cab of tractor 2 and if necessary integrated in means 8. This means 9 for parameter assignment and/or programming, as well as communication interface 8, may also be duplicated on different elements of the hitch.

Of course, the links between means 8 and 9 and tractor 2 and machine 3 respectively may be of hard-wired or wireless nature.

In conformity with the invention, computing and control unit 5, 5' of the 3 or of one of hitched agricultural machine(s) 3', 3" constitutes the master unit of the system for management and guidance of maneuvers and preferably of hitch assembly 1.

It is capable of and designed for, under the control of an adapted program for management of maneuvers:

on the one hand, computing a set path for at least one maneuver to come, initiated automatically or by the driver, and doing so on the basis of preprogrammed parameters relating to the characteristics and physical variables of tractor 2 and of the or of hitched machine(s) 3, 3', 3", to objectives and/or constraints related to the agricultural work to be executed and to the ground to be treated and to functioning options of hitch 1 and by employing an algorithm for prediction of paths and an algorithm for optimization of path settings and, on the other hand, automatically executing the said maneuver or assisting in semiautomatic execution of the same maneuver, and if necessary doing so in repeated manner, by steering tractor 2, directly or by way of management and control unit 7 of this latter, and by recording, in the course of maneuvering, the differences between the predefined set path and the real or currently estimated path, in order to correct them automatically or in order to signal them to the driver in semiautomatic mode, possibly after computation, by way of an adapted algorithm, of maneuvers for corrections of the path to be followed.

Thus the invention provides a hitch 1 capable in particular of automatically or semiautomatically managing the maneuvers of the or of agricultural machine(s) 3, 3', 3" that it integrates, and doing so independently of tractor 2, which is also part of the hitch.

This goal is attained, as indicated in the foregoing, by the fact that computing and control unit 5, 5' of the or of one of hitched machine(s) 3, 3', 3" constitutes the master unit of hitch 1 and that the system for management and guidance of maneuvers of hitch 1 integrates a program employed by unit 5, 5' in order to execute the aforesaid functions/operations.

Consequently, the invention permits in particular, on the one hand, a use of agricultural machines with different tractors and, on the other hand, the possibility of optimizing the paths regardless of the number of machines in the hitch.

In addition, it has been possible to demonstrate the following special advantages of the invention:

- increase of the efficiency of the machine or machine(s) via the reduction of the duration of a maneuver,
- alleviation of the work of the operator and reduction of his fatigue during the repetition of monotonous tasks requiring much care and concentration when they are performed manually,
- possibility of executing the maneuvers at high speed,
- reduction of damage to the soil and of its compaction during repetitive maneuvers (for example, repeated half-turns at the level of the headlands), especially by reducing the distances traveled or by respecting, between hitched elements, turning or articulation angles that favor efficient rolling of the machines,
- assurance of the accuracy of a maneuver regardless of the external conditions (night, fog, etc.).

More specifically, compared with maneuvers managed or steered by tractor 2, the invention has major advantages for the following reasons:

- The majority of tractor drivers do not possess and do not implement an automated half-turn system (delicate maneuver).
- The working implements (as well as the associated control systems) are on the towed (or semi-carried) operational components. The designers of such equipment (carrying active working implements in the course of the agricultural operations in question) are therefore themselves better able to define the optimum functioning conditions of the agricultural operation in question and consequently to define the optimum parameter assignment of the maneuvers associated with the use of their equipment.
- Hitched or semi-carried machine 3, 3', 3" will control its own mechanisms as well as starting and stopping of its systems with greater precision and higher speed.
- The towed (or semi-carried) equipment is provided with many design variants and parameter assignments for adjustments in order to accomplish the different desired technical operations. A data acquisition operation must be executed for each machine (which is time-consuming) if it is the electronic system of the tractor that steers the maneuvers. The data relating to the tractor are much less numerous and less varied than those of the hitched machines, and so the corresponding data acquisition is less time-consuming and is simpler when unit 5, 5' of one of the towed or semi-carried machines steers the maneuvers.

Advantageously, the system for management and guidance of maneuvers, and therefore hitch 1, may also integrate, at the level of tractor 2, at least one additional sensor 10 capable of and designed for furnishing information about the turning angle of steered wheels 2', the speed of rotation of driving wheels 2", the absolute forward speed, the height position of its three-point hitch and/or the drive speed of its power take-off.

Although hitch 1 could be constituted by an elementary assembly comprising the tractor and a single hitched machine 3 (not represented), the beneficial effects of the invention are particularly evident when the hitch comprises, as shown in FIGS. 1A and 1B, at least two agricultural machines 3, 3' hitched in series one after the other to tractor 2, the first machine 3 of the series being connected directly to tractor 2 so as to be towed, carried or semi-carried, and second machine 3' as well as any trailing machines 3" being connected in articulated manner to the respective machine 3, 3' that precedes them.

In addition, at least one sensor 6, 6', 6" furnishing a signal indicative of the mutual relative position of two operational components 2, 3, 3', 3" connected to one another by an articulated linkage 4, 4', 4" is associated with or mounted at the level of the or each articulated linkage 4, 4', 4".

It is preferable that the or each articulated linkage 4, 4', 4" has at least one degree of freedom in the form of the ability to pivot around an axis of rotation that is vertical and/or perpendicular to the soil and that the, some or each sensor(s) 6, 6', 6" associated with the or with articulated linkage(s) 4, 4', 4" furnish(es) a signal indicative of the configuration of the corresponding or of articulated linkage(s) 4, 4', 4" around the axis of rotation in question.

It is effectively the orientation and the modification of the orientation in the horizontal plane or plane of the soil of the different hitched machines 3, 3', 3" that determines the track of hitch 1 and therefore the treatment of the soil and/or of the plant(s) encountered during the path being traveled, for example at the level of the headlands during half-turn maneuvers.

When hitch 1 comprises two machines (3 and 3'—FIG. 1A) or three machines (3, 3", 3"—FIG. 1B) as functional components, several situations are possible:

- either a single one of the said machines (preferably the first of hitch 1, connected directly to tractor 2) is provided with a computing and control unit 5, which then performs the function of master unit of the system for management and guidance of maneuvers,
- or several of the said machines comprise computing and control units 5, 5' and, in this case, unit 5 of first machine 3 of the hitch preferably plays the role of master unit (and the other unit or units 5' is (are) able to perform its (their) usual function at the level of machine 3' in which it (they) is (are) installed and of course can dialog with master unit 5).

In order to be able to achieve geographic tracking of hitch 1 or at least of some of its constitutive components in the field to be treated and therefore to permit completely automated management of maneuvers, it may be advantageously provided that tractor 2 and/or the or at least one of towed agricultural machine(s) 3, 3', 3" is (are) equipped with a geolocation antenna 11, 11', the data of which are transmitted to master computing and control unit 5 and processed by this latter in automatic mode of functioning and/or are displayed visually on communication interface 8.

Preferably master computing and control unit 5 as well as geolocation antenna 11 as the case may be is (are) mounted on first agricultural machine 3 connected directly to tractor 2 while it is being towed or semi-carried.

As FIGS. 1 and 3 of the attached drawings show, and in order to permit automatic management of the maneuvers, master unit 5 is connected to a power control interface 12 of tractor 2 or to management and control unit 7 of this latter by a communication bus 13, this bus 13 also assuring transmission of data between this master unit 5 and the other functional components 8, 10, 11' of the management and guidance system with which tractor 2 may be equipped.

By way of a practical exemplary embodiment, communication bus 13 may be of the type known by the designation ISOBUS (registered trademark) and the steering of tractor 2, equipped with unit 7 (TECU—electronic control unit of the tractor), may be based on the guidance technology known by the designation TIM (Tractor Implement Management—Management of the tractor by the tool).

It may be noted that the constitutive functional elements of the system for management and guidance/steering of maneuvers are, with the possible exception of sensors 6, 6', 6", constituted by elements already present on tractor 2 or machines 3, 3', 3" forming hitch 1, the capabilities and performances of the said system being dependent on their equipment level (presence or not of a unit 7 at the level of tractor 3; presence or not of geolocation antenna 11, 11'; number and nature of sensors present on the machines and the tractor).

In accordance with an additional characteristic of the invention, interface 8 is additionally provided with a means for selecting the mode of functioning between fully automatically controlled, semiautomatically controlled or manually controlled functioning.

The invention also relates to a method for automated or semiautomated management of maneuvers, especially of half-turns, of an articulated or multi-articulated hitch 1 comprising a tractor 2 and at least one towed or semi-carried agricultural machine 3, 3', 3", hitched directly to the said tractor or to a preceding machine in the hitch by at least one articulated linkage 4, 4', 4", as well as a system for management and guidance of maneuvers, especially half-turns. This system is provided with a computing and control unit 5, 5', which is integrated with the or with one of the hitched machine(s) 3, 3', 3" and which is connected on the one hand to at least one sensor 6, 6', 6" informing it about the current mutual relative positions of the two components of each pair of operational components 2, 3, 3', 3" of hitch 1 connected to one another by an articulated linkage, and on the other hand to a unit 7 for management and control of tractor 2 and/or to an interface 8 for communication, especially for display and if necessary for control, with the driver and, finally, with at least one means 9 for parameter assignment or programming, these additional functional components also constituting part of the system for management and guidance of maneuvers.

In conformity with the invention, the said method consists, by way of computing and control unit 5 of agricultural machine 3 in question, acting as master unit of the system for management and guidance of maneuvers of hitch 1, and by execution of an adapted program for management of the maneuvers, of computing a set path for at least one maneuver to come, initiated automatically or by the driver, and doing so on the basis of preprogrammed parameters relating to the pertinent constructive, functional and dimensional characteristics of tractor 2 and of the or of hitched machine(s) 3, 3', 3", to objectives and/or constraint(s) related to the agricultural work to be executed and to the ground to be treated and to functioning options of hitch 1 and by employing an algorithm for prediction of paths and an algorithm for optimization of path settings, then in automatically executing the said maneuver or in assisting in semiautomatic execution of the said maneuver, and if necessary doing so in repeated manner, by steering tractor 2, directly or by way of its management and control unit 7, and by recording, in the course of maneuvering, the differences between the predefined set path and the real or currently estimated path, in order to correct them automatically or in order to signal them to the driver in semiautomatic mode, possibly after computation, by employment of an adapted algorithm, of measures for correction of the path to be followed.

Of course, hitch 1 and its constitutive units correspond advantageously to those described in the foregoing.

In accordance with a first possible alternative embodiment of the method, this latter consists, in semiautomatic mode of management of a maneuver, of displaying, for the operator present in tractor 2 and preferably by way of a display device forming part of communication interface 8, a recommended set path, if necessary adjusted or refreshed in the course of maneuvering as a function of the evolution of the position of tractor 8, of an agricultural machine 3, 3', 3" and/or of hitch 1, and of permitting the operator to execute the maneuver within the limit of circumstantial conditions and of safety as well as of the physical, kinematic and mechanical capabilities of hitch 1, wherein computing and control unit 5 of agricultural machine 3 in question furnishes assistance in the decision in the form of a recommended path and if necessary more or less detailed indications for the execution of actions for steering the maneuver and/or correcting the path.

In accordance with a second possible embodiment of the invention, the method consists, in automatic mode of management of a maneuver by master unit 5, in taking into account data furnished by at least one geolocation antenna 11, 11' installed on tractor 2 or on at least one of hitched machines 3, 3', 3".

During a preparatory phase, the method may consist, prior to the treatment of a jobsite, preferably immediately after constitution of a hitch 1 in view of a simple or complex task, in assigning parameters to the path-computing algorithm by indicating, to master unit 5, different functional, structural and dimensional characteristics of tractor 2 and of the or other agricultural machine(s) 3', 3" of hitch 1 in question.

In relation with the kinematic characteristics of motorized agricultural hitch 1 and of the linkages between its different elements 2, 3, 3', 3", provision is advantageously made to take into account, at the level of the or each articulated linkage 4, 4', 4", at least one degree of freedom in the form of the ability to pivot around an axis of rotation that is vertical and/or perpendicular to the soil, the, some or each sensor(s) 6, 6', 6" associated with the or with articulated linkage(s) 4, 4', 4" furnishing a signal indicative of the configuration of the or of corresponding articulated linkage(s) 4, 4', 4" around the respective axis of rotation in question.

Preferably the following characteristics and variables are entered during the phase of assigning parameters to the path-computing algorithm:

the maximum turning angle of tractor 2, the maximum widths of components 2, 3, 3', 3" of hitch 1, the forward speed desired during the maneuver, the maximum angular speed of turning of the steered wheels of tractor 2, the angles of maximum articulation or pivoting between the hitch components 2, 3, 3', 3", the distance between the rear bridge of a component of hitch 1 and the hitch point of the next component that is connected thereto, the distance between the rear bridge of a hitched component and its point of hitching to the preceding component, the wheelbases of the components of the kinematic assembly formed by hitch 1, the turning direction (right or left).

Similarly, provision may be made to assign parameters to the path-optimizing algorithm by entering the desired optimization objectives, such as, for example, the minimization of the working time, the minimization of the distance traveled by one of the components 2, 3, 3', 3" of hitch 1 during the maneuver and/or the minimization of at least one geometric dimension characterizing the maneuvering space, such as, for example, the width of the headland or the distance traveled by the tractor in the case of a half-turn.

In conformity with a particularly preferred application of the method according to the invention, this latter may consist in assigning parameters to the path-optimizing algorithm, in the case of management of the half-turns, by the indication of execution constraints such as, for example, the imposition of an entrance point and/or of an exit point in the zone of working of the soil or of the crop, or else the imposition of a maximum permitted width of the headland corresponding to a specified multiple, for example 2 or 3, of the working width of the broadest agricultural machine 3, 3', 3" of hitch 1.

According to a first mode of operation, the method may consist in taking into account, during execution under control of the maneuver according to a computed and optimized set path, the data furnished by different sensors 6, 6', 10 mounted on tractor 2 and/or the agricultural machine(s) 3, 3', 3" and/or associated with the or different articulated linkage (s) 4, 4', 4" between components 2, 3, 3', 3" of hitch 1.

According to a second mode of operation, alternative or possibly in addition to the aforesaid first mode, the method may consist in taking into account, during execution under control of the maneuver in accordance with a computed and optimized set path, the data furnished by a geolocating system, at least one corresponding antenna 11, 11' of which is mounted on agricultural machine 3 provided with master unit 5, on another agricultural machine 3', 3" of hitch 1 or on tractor 2, and if necessary in recording the differences from the recommended set path and displaying them and, as the case may be, even computing the compensating actions and indicating them to the operator and/or correcting them automatically.

When tractor 2 is equipped with a unit 7, master unit 5 addresses its instructions to this unit for execution of the maneuver.

When tractor 2 is not provided with unit 7, or when this latter cannot or does not have to be queried in order to execute a maneuver, provision may be made to execute the maneuver in question under the control of master unit 5 by transmission of instructions of this latter to a power control interface 12 of tractor 2, especially for steering the turning, acceleration and braking systems of the said tractor 2.

Thus, by virtue of the invention, it is possible to:

predict the paths optimized in travel time, in distance traveled or according to another geometric criterion, of the components of a tractor-machines assembly (provided with towed or semi-carried agricultural machines) in the course of half-turn operations or in the course of other repeated maneuvers.

steer the tractor in semiautomated or automated manner in order to follow the predefined optimized path with or without use of a GPS or analogous system.

By way of illustration of the invention, a practical exemplary embodiment, which is not to be construed as limitative, is described hereinafter in relation with the attached figures.

It is recalled that the essential technical aspects, which in combination form the preferred embodiment of the invention, are the following points 1 to 4:

1. The use of a mathematical model for computation and simulation of paths (also known by the term path prediction algorithm adapted to agricultural operations), to which the following parameters may be advantageously assigned:

Physical variables related to the tractor and to agricultural machines associated therewith (for example, up to three machines hitched one behind the other and pulled by the tractor).

Constraints on functioning related to the agricultural operation in question.

2. The use of a mathematical model for optimization of the paths (also known by the term optimization algorithm or algorithm for computing the setting of paths), to which the following parameters are advantageously assigned:

Physical variables related to the tractor and to agricultural machines associated therewith (for example, up to three machines hitched one behind the other and pulled by the tractor).

Constraints on objective(s) related to the agricultural operation in question. Without other specification on the part of the operator, a standard mode of optimization may be applied as a function of the maneuver being executed. The possible constraints on objectives include the choice of the operational component of the tractor-machines assembly for which the path must be optimized as a priority.

Choices of functioning set by the operator. Without other specification on the part of the operator, a standard mode of functioning may be applied as a function of the maneuver being executed.

Each computed path that must be respected during the maneuver is known as a set path.

As an example, the optimization algorithm may, in simple or combined manner:

Minimize the time elapsed during the maneuver.

Minimize the distance traveled by one of the components of the tractor-machines assembly during the maneuver.

Minimize one of the geometric dimensions characterizing the space of the maneuver (such as the headland width).

This optimization may be accomplished under constraint:

for example, by respecting an entrance and/or exit point in the zone of working of the soil or crop, and/or by fitting the maneuver into a headland, the width of which is a multiple of the working width of the broadest machine of the hitched assembly.

3. The semiautomated or automated control of the path of the machines in question during repeated maneuvers (such as the half-turns) and compensating, automatically (by virtue of a control algorithm and its associated electromechanical system) or by human supervision, the observed or estimated differences between the established set paths and the real paths of the machines.

In the case of a semiautomated mode of functioning with human supervision, several technologies are usable. At the simplest level, an element will inform the operator about the set paths to be respected (or about one of the directly associated variables, such as the values of articulation or of pivoting angle at the articulations between two hitched elements, or else the values or turning angle of steered wheels). This corresponds to functioning of the "Monitoring" (surveillance) type, and the operator executes the necessary operations. At a higher level of assistance, the operator may also be in possession of information about the difference between the set paths (such that it is possible to estimate them or measure them) and the actually followed paths (or about one or some directly associated variable(s)). Such information will make it possible to construct one or more difference variables that the operator will have to minimize manually by effecting the necessary changes of direction. The control unit of the system, meaning unit 5, will be able to suggest, to the operator, adapted decision strategies via the installed man-machine dialog interface 8. This mode of semiautomated functioning corresponds to functioning of the type "assistance in operation and in decision-making".

In the case of automated functioning, master unit 5 itself defines the corrective actions to be executed and, on the basis of its control algorithm, master unit 5 assumes control of the devices necessary in order to implement these actions. For safety reasons, the operator is able to take over control of the tractor-machines assembly manually.

4. Unit 5 for computing and control of the or of one of machine(s) 3, 3', 3" (towed or semi-carried) controls the operation or one of the desired technical operations (working the soil, maintaining crops, harvesting, etc.) and steers the semiautomated or automated execution of the desired maneuvers.

Within the scope of a semiautomatic mode of functioning, it is provided:

- that a unit 5 of one of the machines 3 hitched to tractor 2 (for example the seeder) or that a machine 3 semi-carried by tractor 2 performs the computations necessary for establishment of the paths to be followed and has an interface 8 for communication with the driver,
- that all of the machines in question (including tractor 2) have sensors and corresponding elements for transmission of information (via an electronic connection, for example an "ISOBUS" connection, or via a wireless connection) to master unit 5 in charge of management of the half-turn operations.

Within the scope of an automatic mode of functioning, it is provided:

- that unit 5, 5', 5" of one of the machines 3, 3', 3" hitched to tractor 2 (for example the seeder), or of a machine semi-carried by the tractor, performs the computations necessary for establishment of the paths to be followed and has an interface 8 for communication with the driver,
- that all of the machines 3, 3', 3" in question (including tractor 2) have sensors and corresponding elements for transmission of information (via an electronic connection, for example an "ISOBUS" connection, or via a wireless connection) to master unit 5 in charge of management of the half-turn operations,
- that unit 5 of one of the machines hitched to the tractor (for example the seeder) or of a machine semi-carried by the tractor steers the tractor during repetitive maneuvers (for example, during half-turn operations). Machine 3 that steers tractor 2 during these maneuvers must therefore take control of the implements necessary within the scope of an adapted technical device, for example a device of the "Tractor Implement Management" type. It does so via an electronic connection (for example, an "ISOBUS" connection) or via a wireless connection, in view of executing the operations provided by the control algorithm.

More precisely, and as shown symbolically at least partly in FIGS. 1 to 4, the system for management and guidance of the maneuvers comprises:

- A path-computing algorithm making it possible to predict the paths of elements of the tractor-machines assembly (computing engine making it possible to determine the paths of the hitched assembly).
- A path-optimizing algorithm (determination of set paths chosen as a function of a specific objective).
- An algorithm for computing path corrections to be applied in the course of maneuvering, also known as control algorithm (optional for functioning in semiautomatic mode).
- A management program, the role of which is in particular to manage the relationships between the algorithms, to ensure good exchange of information at the level of the input and output interfaces of master unit 5 for computing and control and of ensuring good progress of the functions expected at the system level (starting or stopping a sequence of steering of a maneuver, emergency stop mode or degraded operating mode, etc.).
- A master unit 5 for computing and control (electronic device), which in particular is programmed to execute the operations required by the aforesaid algorithms, processes the entering and exiting data streams. It is situated on one of the towed machines or on a semi-carried machine.
- At least one interface 9 for programming master unit 5 for computing and control. One of these interfaces may if necessary be moved to the level of the tractor.
- At least one interface for communication 8 with a display device designed to inform the operator and to facilitate the man-machine dialog. One of these display devices is advantageously moved to the level of the tractor.
- An interface permitting recovery, by master unit 5 for computing and control, of information issued from sensors 6, 6', 6", 10 placed on the tractor or the machines of the hitched assembly.
- An interface 12 permitting master unit 5 for computing and control to take control of the necessary power implements in the case of an automatic mode of functioning.

The path-computing algorithm is assigned parameters by the operator using physical variables related to the equipment used and related to the agricultural operations being executed. The values of the parameter assignments that the operator must enter are those alluded to in the foregoing.

The path-optimizing algorithm is assigned parameters by the operator using the constraints of objective desired by the operator (for example, the maximum width of the headland) and the choices of the operator in the matter of optimization mode (precision, choice of algorithm, starting point of the optimization, etc.).

The algorithm for computing path corrections is also assigned parameters by the operator as a function of the mode of functioning being used (semiautomatic or automatic mode), in particular:

- In order to execute adapted path-correction computations (semiautomatic or automatic mode). A default parameter assignment may be suggested.

In order to assure good display of the settings and information intended for the operator (in semiautomatic mode).

In order to assure good display of the information intended for the operator (in automatic mode) and in order to assign parameters to the path-correction algorithm (in automatic mode).

It is recalled that the path-correction algorithm is optional in the case of a semiautomatic steering device.

The general management program is also assigned parameters by the operator in order to assure good functioning of the input and output interfaces of the computer and, in general, in order to assure good progress of the functions expected at the level of the system for management and guidance of maneuvers.

Figure 5:
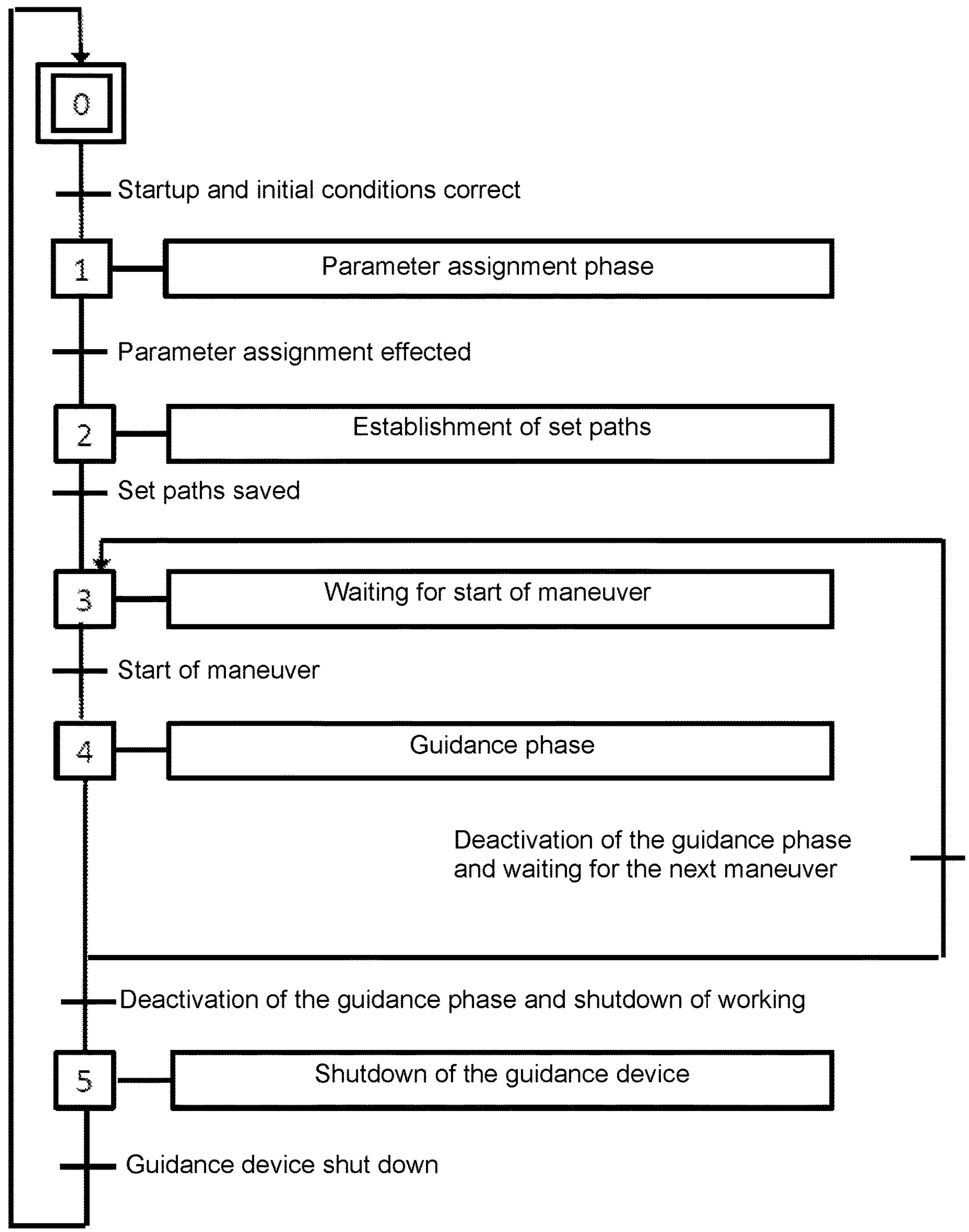
FIG. 5 is a flowchart (Grafcet) illustrating the main stages of the method according to the invention, and it corresponds to a mode known as "normal operation" of the system.

A possible progress of a steering sequence is illustrated in FIG. 5 (in Grafcet form).

Control of the path of the tractor-machines assembly may be achieved in semiautomatic mode or in automatic mode.

In all cases, a sequence of steering and management of the maneuver according to the invention takes place according to the following cycle (see FIG. 5):

0) Startup. The startup is effective if the initial functioning conditions are all met together and if the operator requests startup of the system for management and guidance of maneuvers. Startup corresponds to the transition between step 0 and step 1.

1) Assignment of parameters to the system. It is possible to save a series of previous parameter assignments in memory and to recall them in the system in order to save time.

2) Establishment of set paths. The path-computing algorithm tests path simulations according to the instructions of the path-optimizing algorithm. Once the criteria of objective are met, the set path(s) are chosen and saved. These set paths may be defined by variables related to the position of articulated elements relative to one another (articulation angle, etc.). The path settings may include information about the forward speed of the vehicles. The established paths may be saved and recalled for a subsequent use, thus avoiding the computation phase.

3) Waiting for the maneuver to start. A step of waiting for initiation of the maneuver then takes place, during which the management and guidance system does not impose guidance of the tractor-tools assembly. It is the operator or an optional locating system that initiates the start of the sequence of guidance of a maneuver by the system according to the invention.

4) Guidance phase. Once the maneuver has been started and guidance has been activated, the management and guidance system is active, and it steers tractor 2 in semiautomated or automated manner in order to follow the predefined optimized path with or without use of a GPS system. The operator may be informed by the display device about the progress of operations controlled or computed by the management and guidance system. According to an optional arrangement, provision may be made to recompute, in the course of maneuvering, new set paths in case of an unforeseen event or to adjust the assignment of parameters to the path-correcting algorithm (in order to correct significant path deviations).

Transition 4)-5). Deactivation of the guidance step. The management and guidance system can be deactivated manually at any instant and is automatically deactivated once the maneuver has been terminated. As an example, the operator is able to deactivate the system at the end of the path in order to correct a possible drift manually. Once the maneuver has been terminated, the management program returns to the waiting step until the next maneuver.

5) Shutdown of the steering device. The operator is able to shut down the function of the system for semiautomatic or automatic management and guidance at any time (especially when the work in the field is terminated). Each step must therefore be connected to this shutdown step (not represented in FIG. 5). The system is shut down under satisfactory safety conditions.

The Grafcet just described by way of example corresponds to a mode of operation of the system said to be "normal". The emergency stop modes or the degraded operation modes (such as they are usually named during an automation run using Grafcet tools) have not yet been described in this Grafcet of normal operation, but can be easily deduced therefrom by the person skilled in the art.

Within the scope of execution of operating phases of the method, the establishment of set paths takes place after the parameter-assignment phase. In one possible evolution of the invention, it may also take place in the course of maneuvering in the case of an unforeseen event.

The path-computing algorithm follows the instructions sent by the path-optimizing algorithm, to perform the first path simulation (initial conditions of the computation), then to increment the simulations (to test new paths capable of yielding better results) or to discontinue a computation or series of computations when a satisfactory result has been found. This result becomes the set path (or the set paths) to be respected. The established paths may be saved and recalled for subsequent use while avoiding the computation phase.

By means of a model, the inventors have been able to simulate half-turns (or other maneuvers involving change of direction) for a tractor and several hitched machines with acceptable precision, provided that the operator corrects the "drift" observed at the end of travel. The origin of the observed drift is related to the resistance of the soil, which exerts reactions on the steered wheels, which sink into the soil. The model used was based on fundamental equations disclosed in the publication of Zakin J. 1967, "Applied theory of the articulated lorry" (Applied theory of the articulated truck), Monograph// Закин Я. Х. Прикладная теория движения автопоезда -M.: Транспорт, 1967-252 c. and was adapted to the case of agricultural engines. The model also takes into account the interactions between the soil and the vehicle wheels as well as the mechanical interactions that take place at the level of the articulations between the machines (friction). This model, cited by way of example, is used in the embodiment described in detail hereinafter as a mathematical motor of the path-computing algorithm.

Figure 7:
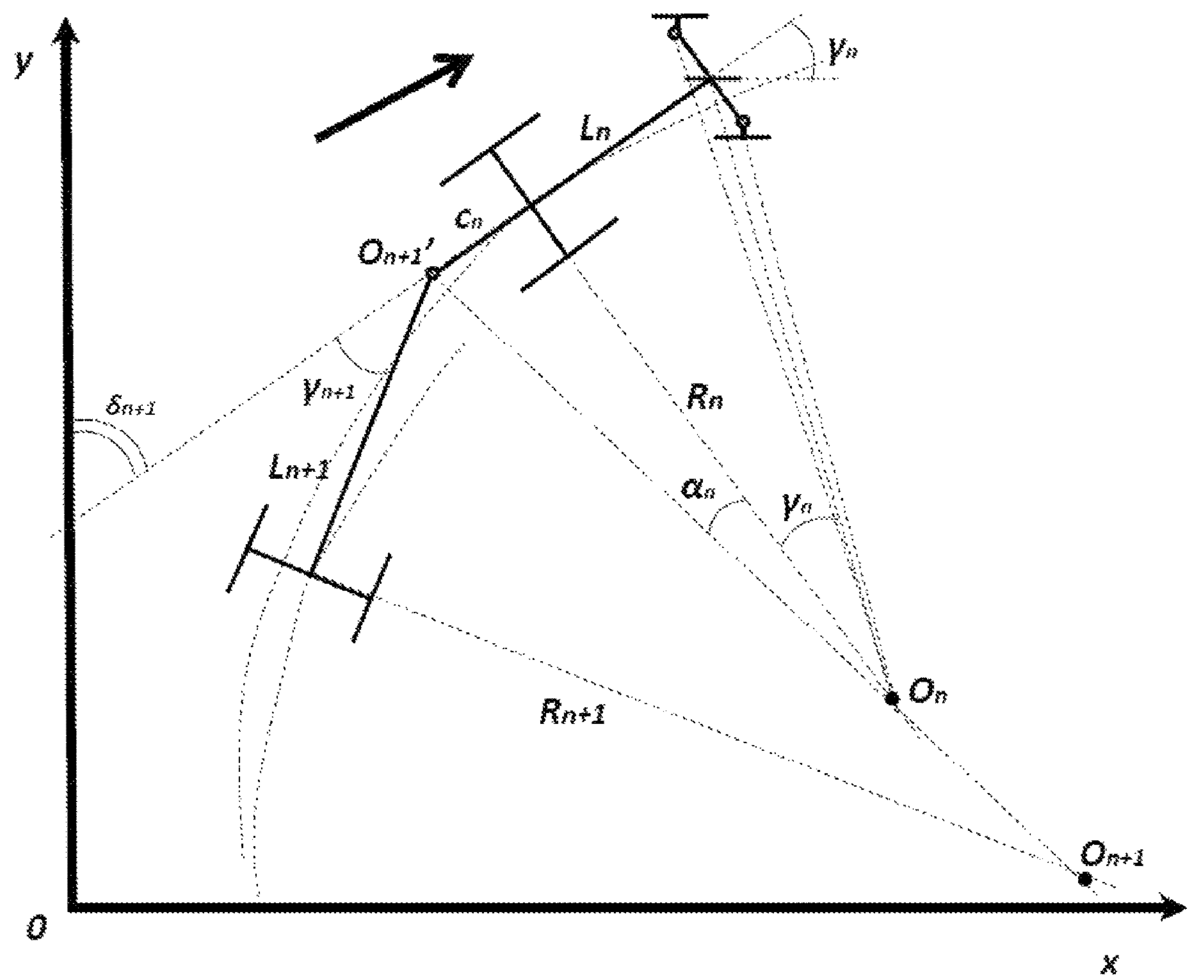
FIG. 7 is a schematic diagram of multi-articulated assembly of an agricultural hitch.

Geometrically, for any element whatsoever of a multi-articulated assembly of the agricultural hitch type, the turning angle is the angle between the two axes connecting the instantaneous center of rotation and the centers of the front and rear bridges (see FIG. 7):

$$\gamma_n = \operatorname{arctg}\frac{L_n}{R_n}$$

where: $L_n$—The wheelbase of element n, $\gamma_n$—The turning angle of element n, $R_n$—The turning radius of element n, $O_n$—The center of rotation of element n at a given instant, $O_{n+1}$'—The articulation point between element n and element n+1.

In the foregoing formula: n=2 for tractor 2, n=3 for first hitched element 3, n=4 for second hitched element 3', etc. The angular velocity $\omega_2$ of turning of steered wheels 2' of the tractor will define the behavior of the assembly comprising tractor and 1st hitched machine, then consequently that of the following machines. This action is characterized by a variable $k_n$ (known as half-turn state parameter), which characterizes the change of curvature of the obtained path relative to the distance traveled on the turning curve and (according to Zakin J., 1967) is:

$$k_n = \frac{\gamma_n}{S_n} = \frac{\dot{\gamma}_n}{v_n},\ [m^{-1}]$$

where: $S_n$—The distance traveled on a given path.

In the case of the tractor, and taking into consideration that the movement takes place on an ideal and plane surface, without sliding or influence of the soil on the direction taken by the movement, it may be considered (according to Zakin J., 1967) that:

$$k_2 = \frac{\dot{\gamma}_2}{v_2} = \frac{\omega_2}{v_2},\ [m^{-1}]$$

Within the scope of the present invention, the inventors have developed equations and a specific method for taking into account non-ideal cases, for which the paths of the agricultural engines are influenced by their interactions with the soil. In this case, it is possible to replace the turning angle $\gamma_2$ of the wheels of the tractor by a corrected (or "real") turning angle $\gamma_{2c}$ that takes interactions with the soil into account.

If the tractor is equipped with a geolocating system, it is directly possible to replace $\gamma_2$ by $\gamma_{2c}$ in the above equation, since it will be possible to measure $\gamma_{2c}$ by geolocation. In the absence of geolocating system, a mathematical rule of calibration between $\gamma_2$, $\omega_2$ and $\gamma_{2c}$ of the following type is developed:

$$\gamma_{2c}=A.\gamma_2^{a}+B.\omega_2^{b}+C$$

where: A, a, B, b and C correspond to numerical adjustment parameters.

In all cases, the values of $\gamma_{2c}$ are made to replace the values of $\gamma_2$ in the path-simulating equations when the interactions with the soil are estimated as being significant.

In fact, such a calibration rule makes it possible to approach results obtained by the Applicant and the inventors in the course of tests in the field. It also makes it possible to address cases that take into account phenomena of sliding (or skidding) on agricultural soil. In the case of perfect adherence (without lateral or longitudinal skidding), a=b=1, and only the resistance of the earth on both sides of the steered wheels of the tractor (which sink partly into the soil) opposes, on the one hand, turning (direct effect on $\gamma_2$) and, on the other hand, lateral displacement of the steered wheels when the steering wheel is turned (direct effect on $\omega_2$). This resistance of the earth on each side of the steered wheels therefore creates a drift angle ($\gamma_{2c}-\gamma_2$). Assignment of parameters to the equation is achieved by adjustment with experience (method of successive approximations) according to a database or according to a method of calibration during the test of a typical maneuver.

The behavior of dragged elements is influenced by the change of direction of the towing force exerted on the corresponding hitch point. Analogously, the path of element n+1 will be a derivative of the path of the preceding element. The differential equation of evolution of the articulation angle between two elements may be deduced from the aforesaid publication of Zakin J. (1967);

$$\frac{d\gamma_{n+1}}{dt} + \frac{v_n \sin\left(\frac{1}{i_n}\gamma_{n+1} - \alpha_n\right)}{L_{n+1}\cos(\alpha_n)\cos\left(\frac{1}{i_n} - 1\right)\gamma_{n+1}} = \frac{v_n}{L_{n+1}}\tan(\gamma_n)$$

In this equation:

$\alpha_n$—The angle formed between the axis passing through the kinematic center of a towing element n with the instantaneous center of rotation of towed element n+1, and the axis connecting the hitch point with this instantaneous center of rotation of towed element n+1.

$i_n$—The direct mechanical linkage ratio of hitched elements n and n+1.

The mechanical linkage ratio $i_n$ makes it possible to take into account the imperfections of the points of articulation between hitched elements (friction, etc.) in the transmission of movements and of changes of direction. The inventors have developed equations and a method for taking into account non-ideal cases in the expression of $i_n$ (or by using other parameters not disclosed in the publication of Zakin, 1967), when the paths of agricultural engines are influenced by friction or by mechanical resistances that may exist at the level of the points of articulation between hitched elements.

The mechanical interactions that take place at the level of the articulations between the machines (friction, etc.) may therefore be taken into account by virtue of a mathematical function that modifies, for example, the value of $i_n$ to $i_{nc}$ (corrected or "real" mechanical linkage ratio). Consequently, a general rule (which is simplified in the simple cases) will be used to estimate $i_{nc}$, as follows:

$$i_{nc}=A'.i_n^{a'}+C'$$

where: A', a' and C correspond to numerical adjustment parameters. For an ideal articulation: A'=a'=C'c=1.

The movement of element n+1 may also be influenced by the behavior, on the soil, of the wheels of the preceding element even if this latter is not the tractor (according to the same principle described in the foregoing for the tractor wheels). Effectively, the towing direction may be different from that given by the angle $\gamma_{n+1}$ when a sliding angle can be detected. Even if the wheels of element n are not steered, the earth on each side of the wheels of element n may exert a resistance to turning. In the equations, $\gamma_{n+1}$ can be replaced by $\gamma_{n+1c}$ according to a mathematical calibration rule analogous to that of the aforesaid case of the tractor:

$$\gamma_{n+1c}=A_n.\gamma_n^{a_n}+B_n.\omega_n^{b_n}+C_n$$

where: $A_n$, $a_n$, $B_n$, $b_n$ and C correspond to numerical adjustment parameters. If element n does not have steered wheels, B is equal to zero.

These equations and the rules alluded to in the foregoing make it possible to construct path simulations for the tractor and the hitched elements, even for complex cases. In simple cases, it will not be necessary to modify the values of the turning or articulation angles or the mechanical linkage ratio into corrected values.

Figure 8A:
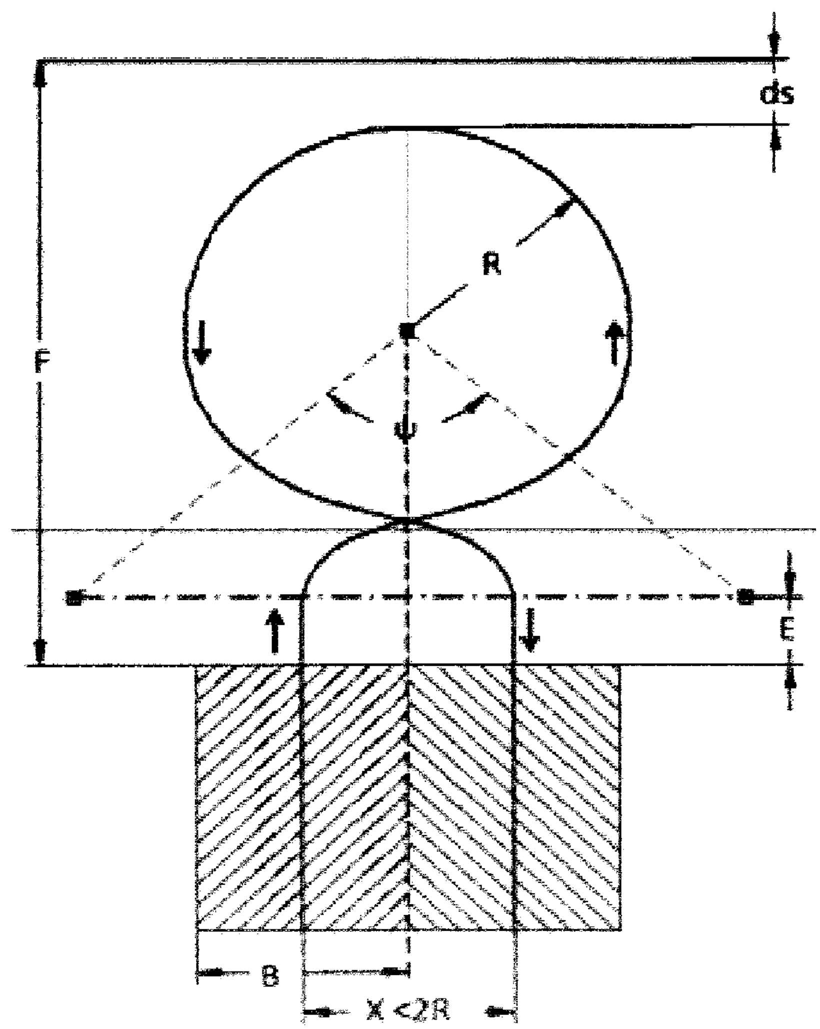
FIG. 8A is an example of a half-turn performed by a tractor at an end of the field.
Figure 8B:
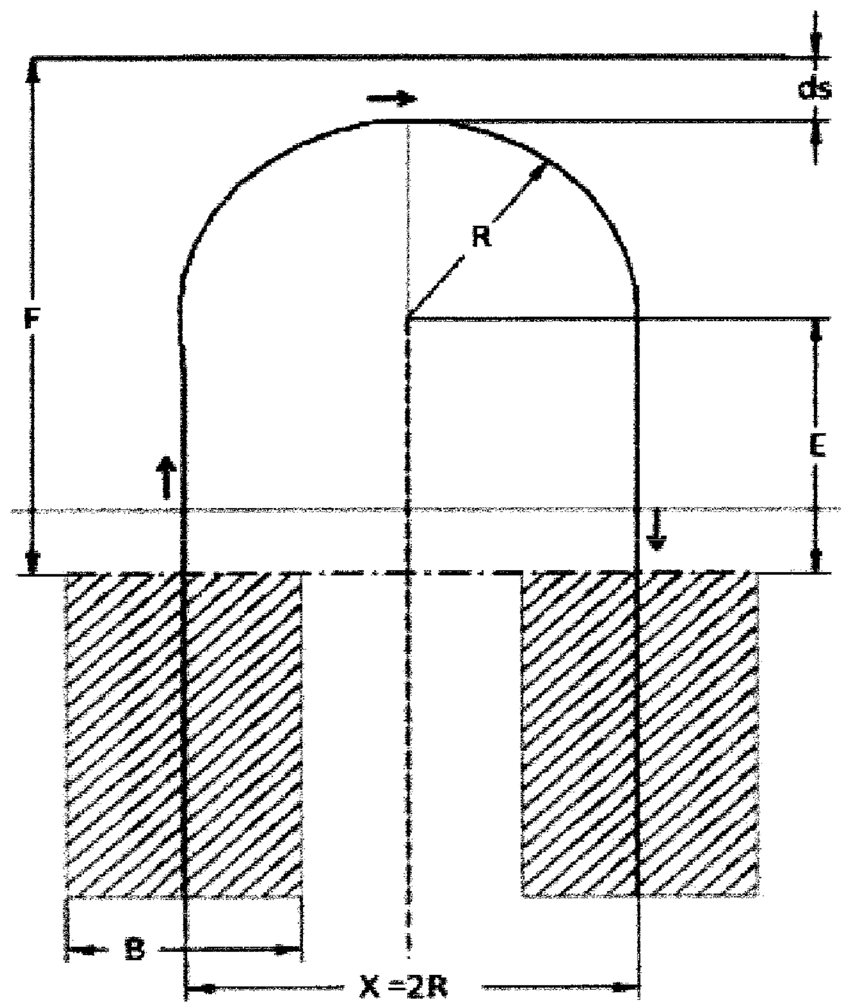
FIG. 8B is another example of a half-turn performed by a tractor at the end of the field.
Figure 8C:
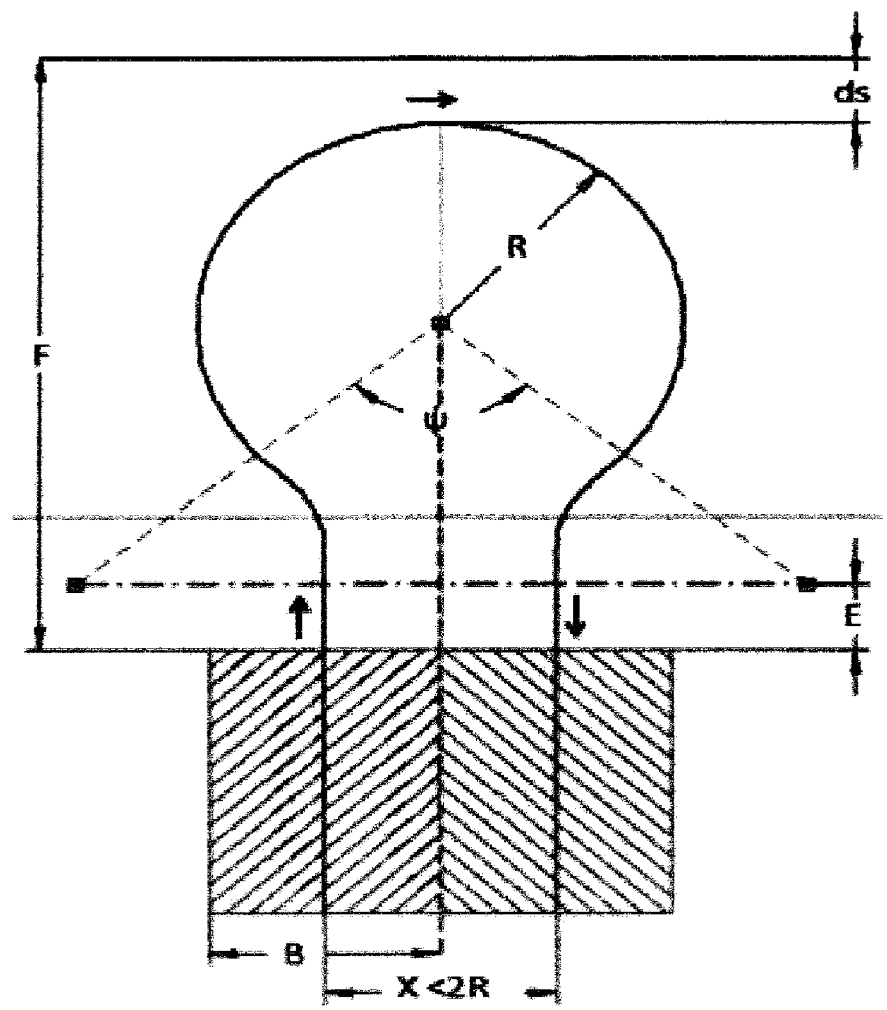
FIG. 8C is another example of a half-turn performed by a tractor at the end of the field.

The table below gives an example of a developed model (computation of the articulation angle between tractor 2 and first hitched operational component 3). Within the scope of this example, the tractor may describe any turning path whatsoever. One said half-turn said to be "horseshoe-shaped" is part of these paths. FIG. 8 present examples of half-turns that can be used at the end of the field and can be simulated (FIG. 8A: half-turn shaped like a crossed loop/FIG. 8B: half-turn shaped like a semicircle/FIG. 8C: half-turn shaped like a horseshoe or bootlace). For example, to execute a horseshoe-shaped half-turn, tractor 2 first follows a straight path, then a transitional entrance phase, then a phase of circular movement at constant turning angle, then a transitional exit phase to return finally to a straight path. In the presented case, the interactions with the soil or the mechanical friction at the articulations are initially considered to be negligible.

| Maneuvering phase | Key parameter | Equation |
| --- | --- | --- |
| Transitional entrance and exit phases of the tractor | $\gamma_2$ | $\begin{cases} x_0 = \frac{1}{k_2}\int_0^{\gamma_{2max}} \cos\left(-\frac{1}{k_2 L_2}\ln\cos\gamma_2\right)d\gamma_2 \\ y_0 = \frac{1}{k_2}\int_0^{\gamma_{2max}} \sin\left(-\frac{1}{k_2 L_2}\ln\cos\gamma_2\right)d\gamma_2 \end{cases}$ |
| Circular movement of the tractor | $\delta_{2\,max}$ | $\begin{cases} x_c = x_0 + R_{2_{min}}\cos\delta_{2_{max}} \\ y_c = y_0 + R_{2_{min}}\sin\delta_{2_{max}} \end{cases}$ |
| Articulation angle defining the path of the following hitched elements | $\gamma_n$ | $\frac{d\gamma_{n+1}}{dt} + \frac{v_n \sin\left(\frac{1}{i_n}\gamma_{n+1} - \alpha_n\right)}{L_{n+1}\cos(\alpha_n)\cos\left(\frac{1}{i_n} - 1\right)\gamma_{n+1}} = \frac{v_n}{L_{n+1}}\tan(\gamma_n)$ |

In this table, the following parameters and variants are mentioned:
$\delta_{2max}$ - The angle of deflection of the tractor relative to the initial direction;
$k_2$ - The state coefficient associated with the tractor;
$L_2$, $L_{n+1}$ - The wheelbases of the towing element and of a hitched element;
$\gamma_2$ - The turning angle of the tractor;
$\gamma_n$, $\gamma_{n+1}$ - The articulation angles of two successive hitched elements;
$x_0$, $y_0$ - The coordinates of the path of the tractor;
$x_c$, $y_c$ - The coordinates of the center of the circular path;
$R_{2min}$ - The turning radius;
$\alpha_2$ - The angle formed by the axis connecting the kinematic center of a towing element with the instantaneous center of rotation and the axis connecting the hitch bridge with this center of rotation;
$i_n$ - The direct mechanical linkage ratio of elements such as described by Zakin J. (1967).

If necessary, the interactions with the soil are then integrated into this model to determine the path obtained by virtue of a mathematical function that makes it possible to determine the consequences of the interaction between the soil and the tires (especially related to the turning angle of the wheels). In this case, turning angle $\gamma_2$ of the tractor wheels is replaced by a corrected (or "real") turning angle $\gamma_c$, which takes into account the interactions with the soil as described in the foregoing. The mechanical interactions that take place at the level of the articulations between the machines (friction, etc.) may be taken into account by virtue of a mathematical function that modifies, for example, the value of $i_n$ to $i_{nc}$ (corrected or "real" mechanical linkage ratio), or which modifies, for example, the value of the articulation angle $\gamma_n$ to a corrected (or real) articulation angle $\gamma_{nc}$. These modifications are made as described in the foregoing.

At this stage, a means for simulating the path of the tractor and of its hitched elements is available.

As regards the path-optimizing algorithm, it is able to function according to several principles. First of all, it is able to work systematically on an experimental area that is bounded (has limits) by incrementing each successive computation by a step fixed beforehand. For a test in one dimension, this means, for example, testing a turning speed ranging from 0.01 rad/s to 1 rad/s in steps of 0.01 rad/s. Among the computed paths, the set path (or the set paths in the case of all paths of machines 3, 3', 3" and of tractor 2) chosen by the optimizing algorithm will be that which maximizes the objective fixed by the operator (for example, minimizing the distance traveled during the maneuver).

At the level of the optimization algorithm, it is possible to reduce the number of computations to be performed by using a "direct optimization method". What is understood by direct optimization method is a succession of error tests aimed at a result while minimizing the number of tests to be performed, These methods are known, for example, from the following publications: Fiat, O. (2007), "Utilisation et développement de la méthode du Simplexe—Nouvelles procédures d'optimisation de la démarche expérimentale" [Use and development of the simplex method—New procedures for optimization of the experimental process], Doctoral Thesis, Limoges University, 188 p.; Porte, C. (2002), "Méthodes directes d'optimisation—Méthodes à une variable et Simplexe" [Direct optimization methods—Monovariate and simplex methods], Techniques de l'Ingénieur, P228, 1-18; Porte, C. (2002), "Méthodes directes d'optimisation—Méthodes dérivées de la méthode Simplexe—Méthode de Nelder et Mead (Modified Simplex)" [Direct optimization methods—Methods derived from the simplex method—Nelder-Mead method (modified simplex)], Techniques de l'Ingénieur, P229, 1-15.

These methods function just as well for a monovariate study as for a multivariate study. The best known of the methods for a monovariate study is that of the Fibonacci sequence and the best known method for a multivariate study is the simplex method. These methods are applicable within the scope of the invention and, as soon as acceptable paths (respecting the minimum objectives fixed by the operator) are attained, the optimization is terminated and the set paths are fixed.

Hereinafter, a more detailed description, by way of non-limitative examples, will be given of the controls of paths in the course of execution of a maneuver, successively in semiautomatic and automatic modes of functioning of the system for management and guidance (steering) of maneuvers.

In the case of automated functioning, master unit 5 itself defines the corrective actions to be taken and, on the basis of its control algorithm, master unit 5 takes control of the implements necessary for employment of these corrective actions. For safety reasons, the operator is able to take control of the tractor-tools assembly manually.

In one example, control of the steering bar of tractor 2 (or its equivalent) is assumed by master unit 5 of machine 3. The management and guidance system may also take control of the forward speed of the tractor. The operator may be informed by a display device of a communication interface 8 about the progress of the operations controlled by the guidance system. The operator is able, for example, to deactivate the system for management and guidance of the maneuvers at the end of the path in order to correct for any drift that may have occurred.

Figure 6:
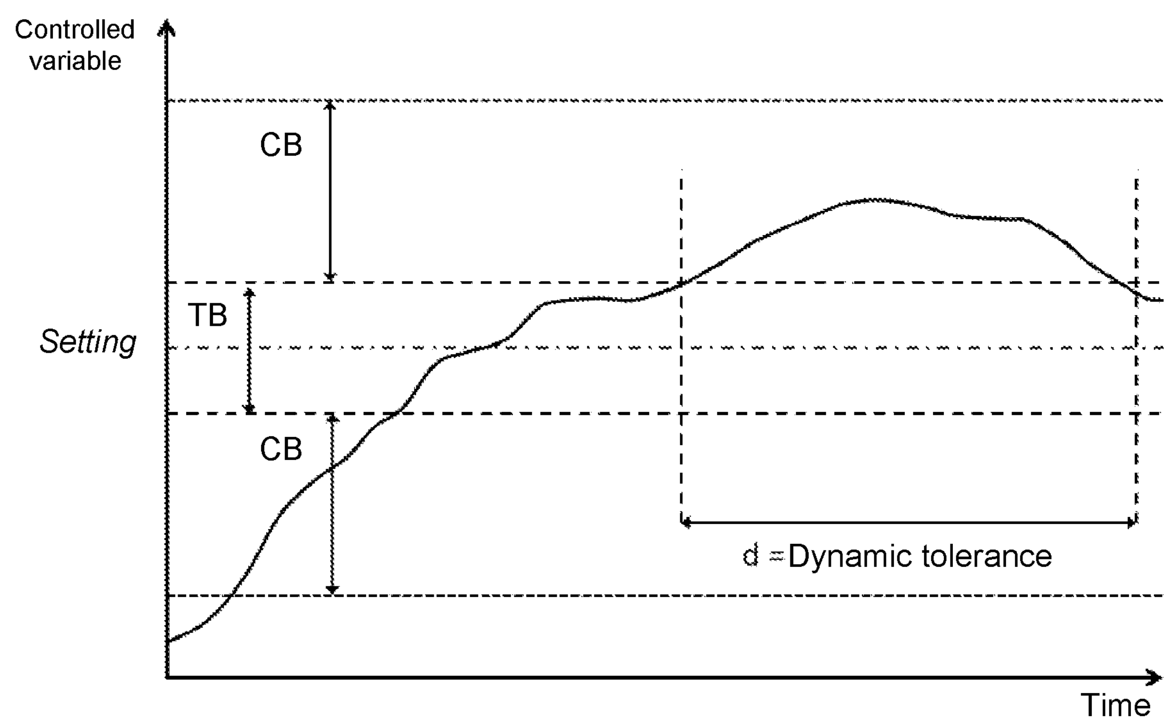
FIG. 6 is a time diagram of the execution of a maneuver with path correction, with employment of the method and of the system according to the invention.

For the computation of path corrections, it is possible in particular to use the following known parameters, illustrated in FIG. 6:

A "tolerance band" (TB) without path correction is defined around the set path. The difference, at an instant t, between the set path of a machine 3, 3', 3" and its theoretical path is denoted by $E_{tn}$, where n is the relative position of the machine in question in the hitch (n=1 for the tractor, n=2 for the first hitched machine, etc.). No path correction is applied if $E_{tn}$ is situated within tolerance band TB.

A "correction band" (CB) is defined around the set path. If the difference between the real path and the set path of tractor 2 is outside this path-correction band, the tractor will turn to the right or to the left to the maximum of its capabilities.

A dynamic tolerance (d), which represents a maximum tolerable duration of excursion from the tolerance band. In case of difference, the paths must be corrected within a time shorter than d.

Within the interior of the path-correction band and outside the tolerance band, the path corrections may be computed according to a PID mode of regulation, simplified into a linear combination of its components (Proportional action, Integral action, Derivative action), or may be computed according to a fuzzy logic mode of regulation.

In relation with PID regulation, examples of application by servo control of position (and therefore by keeping to the path) are given in the following publication: Jacob D. (2004), Applications de la commande PID—Asservissement temperature et position [PID control applications—Servo control of temperature and position], Techniques de l'Ingénieur, S 7 718, 2-24.

The use of fuzzy logic for vehicle guidance is known, for example, from Yung, N. H. C. & Cang Y. (1999), "An intelligent mobile vehicle navigator based on fuzzy logic and reinforcement learning" (An intelligent mobile vehicle navigator based on fuzzy logic and reinforcement learning), Systems, Man, and Cybernetics, Part B: Cybernetics, IEEE Transactions on, vol. 29, no 2, 314-321. An attempt to apply fuzzy logic for guidance of an agricultural sprayer is described in Cho S. I. & KI N. H. (1999), "Autonomous speed sprayer guidance using machine vision and fuzzy logic" (autonomous guidance of a speed sprayer using machine vision and fuzzy logic), Transactions of the ASAE, vol. 42, no. 4, 1137-1143. In general, these protocols satisfy basic rules of regulation by fuzzy logic such as described, for example, in Bühler H. (1994), "Réglage par logique floue" [Regulation by fuzzy logic], Ed. Presses Polytechniques et Universitaires Romandes, 181 p.

Parameter assignment for path correction can be adjusted by the operator (tolerance band, path-correction band, parameters of regulation by PID, parameters of regulation by fuzzy logic or other method). On this subject it is possible to cite the method of successive approximations (CERR M. (1991), Instrumentation industrielle, Tome 2 [Industrial instrumentation, Volume 2], Col. Tec et Doc, Ed. Lavoisier, 747 p., especially pages 273 and 274). It is also possible to apply an identification process (method of Nyquist, of Strejc, of Broïda, of Ziegler and Nichols, of Dindeleux) by having a maneuver executed manually on the multi-articulated assembly then constructing a mathematical model thereof.

Parameter assignment may also be applied in auto-adaptive mode (parameter assignment is self-optimizing as a function of residual differences persisting between the setting and the paths being followed). Numerous auto-adaptive correctors exist (M'Saad M. & Chebassier J. (2000), Commande adaptative des systèmes [Adaptive control of systems], Techniques de l'Ingénieur, S7 426, 1-25). These methods are applicable to both regulation by PID and to fuzzy logic. The intelligent "layer" that optimizes the control rule of the corrector is able to rely on different principles, including the self-learning processes (for example, of the neural network type).

In general, the proposed automatic correction modes are part of large servo-control families used in mobile robotics to guide a vehicle, such as described, for example in Fargeon C. & Quin J-P. (1993), "Robotique mobile" [Mobile robotics], Ed. Teknea et DGA, 358 p., especially in Chapters 5 and 9.

It is possible to propose a default mode of automatic regulation. By reason of the speed of rotation of the steering wheel, which is limited, an integral action is then necessary (because otherwise a small residual path difference would persist). By associating the tractor gain (obtained by calibration or computed by virtue of designer data) with the fixed speed of rotation of the steering wheel, it is possible, for example, to compute a default correction value PI according to the method published by CERR (1991), which is based on variables, denoted by Tu and Tg, obtained after a test. It is also possible to include, in the invention, a default mode of regulation by fuzzy logic, constructed on the same principle.

It is also recalled that, in semiautomatic mode of functioning:

the setting is established by master unit 5, the mobilization of actuators (at least of tractor 2) is achieved by the operator, it is possible that master unit 5 also provides elements of information (following a computation) about the corrective actions to be applied and their intensity (as a function of the level of development of the operator-assistance system).

In the case of a semiautomated mode of functioning with human supervision, several technological levels are usable.

At the simplest level, an element will inform the operator about the set paths to be respected (or about one or more directly associated variables, such as values of articulation angle at the articulations between two hitched components, or else values of the turning angle of steered wheels). This corresponds to functioning of "Monitoring" (surveillance) type, and the operator executes the operations necessary to obtain this result.

At a higher level of assistance, the operator is also able to obtain information about the difference between the set paths (such that it is possible to estimate or measure them) and the paths actually being followed (or about one or more of the directly associated variables). This information will make it possible to construct one or more difference variables that the operator will have to minimize manually by making the necessary changes of direction.

Master unit 5 for computing and control of the system may suggest, to the operator, adapted decision strategies via the installed interface 8 for communication and man-machine dialog (for example, it may indicate that the steering wheel should be turned more quickly or less quickly in a given direction). This semiautomated mode of functioning corresponds to functioning of type "operator and decision-making assistance". The computing modes are, for example, similar to those employed in the case of automatic functioning and are usable for suggesting actions to be executed by the operator in "operator assistance" mode. However, a simplified computing mode may also be used in semiautomatic mode. This simplified mode is based on a fuzzy logic corrector (see, for example, Kaufman A. (1992), Introduction à la logique floue [Introduction to fuzzy logic], Techniques de l'Ingénieur, A 120, R 7 032, 1-9).

In the course of maneuvering, master unit 5 of the management and guidance system computes the actions to be executed at the level of the power and steering implements of tractor 2 in order to follow the set path associated with the tractor and to respect the constraints due to parameters assigned by the operator. Optionally, this computation may be executed by virtue of geolocation data furnished, for example, by a GPS device. This computation may be executed on the basis of information furnished by the sensors of hitched assembly 1 independently of a geolocating system. The executed computations make it possible to compare the real position of the tractor and of the hitched machines with their theoretical positions (such as defined by their set paths). The difference between the real path and the set path will be compensated by the management and guidance system. For this purpose, the characteristics related to machines 3, 3', 3" are saved by way of interface 9 in the management and guidance system. The acquisition of equipment characteristics (independently of parameter assignment to the path-correction algorithm) may also be achieved by virtue of an experimental parameter assignment. The experimental parameter assignment consists in having an operation executed on the tractor (for example, a rotation of the steering wheel as far as the right and left stop, followed by a displacement of the multi-articulated assembly with recording of the articulation angles between hitched elements), after which the software determines the parameters necessary for its computations. Additional sensors are disposed on the agricultural equipment in order to supplement or replace the information furnished by the geolocating device (at least angle sensors fixed on articulation points 4, 4', 4" of the components of the hitch or infrared distance-measuring devices fixed on the components of the hitch).

Of course, the invention is not limited to the embodiments described and represented in the attached drawings. Modifications are still possible, especially from the viewpoint of the constitution of the diverse elements or by substitution of equivalent techniques, albeit without going beyond the scope of protection of the invention.

The invention claimed is:

1. A hitch comprising:

a tractor;

a towed or semi-carried agricultural machine hitched to the tractor by an articulated linkage; and a system for management and guidance of maneuvers including a computing and control unit integrated with the agricultural machine, a first sensor informing about current mutual relative positions of the tractor and the agricultural machine connected to one another by the articulated linkage, a unit for management and control of the tractor, an interface for communication with a driver, and a unit for parameter assignment or programming, wherein the computing and control unit constitutes a master unit of the system for management and guidance of maneuvers, wherein the system for management and guidance of maneuvers is configured to:

compute a set path for a maneuver to come, initiated automatically or by the driver, the set path being based on preprogrammed parameters relating to characteristics and physical variables of the tractor and of the agricultural machine, at least one of objectives or constraints related to agricultural work to be executed, ground to be treated, or operating options of the hitch, and an algorithm for prediction of paths and an algorithm for optimization of path settings, and automatically execute the maneuver by steering the tractor, directly or by the unit for management and control of the tractor, and record, during maneuvering, differences between a predefined set path and a real or currently estimated path, in order to correct the differences automatically, or assist in semiautomatic execution of the maneuver by signaling the differences to the driver in semiautomatic mode by way of an adapted algorithm, of maneuvers for corrections of a path to be followed, wherein a parameter for computing the set path includes a turning angle of steered wheels of the tractor based on a wheelbase of the tractor and a turning radius of the tractor which is then corrected by taking interactions with soil into account, and the corrected turning angle of the steered wheels of the tractor is used to calculate transitional entrance and exit phases of the tractor, the interactions with the soil including a drift angle created on the steered wheels due to resistance of the soil on both sides of the steered wheels, and wherein the transitional entrance and exit phases of the tractor are calculated by $$\begin{cases} x_0 = \frac{1}{k_2}\int_0^{\gamma_{2max}} \cos\left(-\frac{1}{k_2 L_2}\ln\cos\gamma_2\right)d\gamma_2 \\ y_0 = \frac{1}{k_2}\int_0^{\gamma_{2max}} \sin\left(-\frac{1}{k_2 L_2}\ln\cos\gamma_2\right)d\gamma_2 \end{cases},$$

in which $x_0$, $y_0$ are coordinates of a path of the tractor, $k_2$ is a state coefficient associated with the tractor, $L_2$ is the wheelbase of the tractor, and $\gamma_2$ is the corrected turning angle of the wheels of the tractor.

2. The hitch according to claim 1, further comprising a second sensor capable of and designed for furnishing information about at least one of the turning angle of steered wheels, a speed of rotation of driving wheels, an absolute forward speed, a height position of a component of the hitch, or a drive speed of a power take-off.

3. The hitch according to claim 1, wherein the agricultural machine comprises first and second agricultural machines hitched in series one after the other to the tractor, the first agricultural machine of the series being connected directly to the tractor, and the second machine being connected in articulated manner to the first agricultural machine, and wherein the first sensor furnishes a first signal indicative of the mutual relative position of the tractor and the first agricultural machine, and a second sensor furnishes a second signal indicative of the mutual relative position of the first agricultural machine and the second agricultural machine.

4. The hitch according to claim 1, wherein the articulated linkage pivots around an axis of rotation that is at least one of vertical or perpendicular to the soil, and the first sensor furnishes a signal indicative of a configuration of the articulated linkage around the axis of rotation.

5. The hitch according to claim 1, wherein at least one of the tractor or the agricultural machine is equipped with a geolocation antenna, data of which is transmitted to the computing and control unit and processed by the computing and control unit for at least one of an automatic mode of functioning or being displayed visually on the interface for communication.

6. The hitch according to claim 5, wherein the computing and control unit and the geolocation antenna are mounted on the agricultural machine which is connected directly to the tractor.

7. The hitch according to claim 1, wherein the computing and control unit is connected to a power control interface of the tractor or to the unit for management and control of the tractor by a communication bus, the communication bus assuring transmission of data between the computing and control unit and the other components of the system for management and guidance of maneuvers.

8. The hitch according to claim 1, wherein the interface for communication with the driver is provided with a means for selecting a mode of functioning between fully automatically controlled, semiautomatically controlled or manually controlled functioning.

9. A method for automated or semiautomated management of maneuvers of a hitch comprising a tractor, an agricultural machine hitched to the tractor by an articulated linkage, and a system for management and guidance of maneuvers provided with a computing and control unit integrated with the agricultural machine, a sensor informing the computing and control unit about current mutual relative positions of operational components of the hitch connected to one another by the articulated linkage, a unit for management and control of the tractor, an interface for communication with a driver, and means for parameter assignment or programming, the method comprising:

computing a set path for a maneuver to come, initiated automatically or by the driver, the set path being based on preprogrammed parameters relating to characteristics of the tractor and at least one of objectives or constraints related to the agricultural work to be executed and to the ground to be treated and to functioning options of the hitch and by employing a path-computing algorithm for prediction of paths and a path-optimizing algorithm for optimization of path settings; and automatically executing the maneuver by steering the tractor, directly or by the unit for management and control of the tractor, and by recording, during maneuvering, differences between a predefined set path and a real or currently estimated path, in order to correct the differences automatically, or assisting in semiautomatic execution of the maneuver by signaling the differences to the driver in semiautomatic mode by employment of an adapted algorithm, of measures for correction of a path to be followed, wherein a parameter for computing the set path includes a turning angle of steered wheels of the tractor based on a wheelbase of the tractor and a turning radius of the tractor which is then corrected by taking interactions with soil into account, and the corrected turning angle of the steered wheels of the tractor is used to calculate transitional entrance and exit phases of the tractor, the interactions with the soil including a drift angle created on the steered wheels due to resistance of the soil on both sides of the steered wheels, wherein the method further comprises, prior to treatment of a jobsite, assigning parameters to the path-computing algorithm by indicating different functional, structural and dimensional characteristics of the tractor and of the agricultural machine, and wherein the following characteristics and variables are entered during a phase of assigning parameters to the path-computing algorithm:

a maximum turning angle of the tractor, maximum widths of the components of the hitch, a forward speed desired during the maneuver, a maximum angular speed of turning of the steered wheels of the tractor, angles of maximum articulation or pivoting between the components of the hitch, a distance between a rear bridge of a component of the hitch and a hitch point of a next component that is connected thereto, a distance between a rear bridge of a hitched component and its point of hitching to a preceding component, wheelbases of the components of a kinematic assembly formed by the hitch, and a turning direction.

10. The method according to claim 9, further comprising, in the semiautomatic mode of management of a maneuver, displaying, for the driver present in the tractor, a recommended set path of the hitch, and permitting the driver to execute the maneuver within safety limits of the hitch, the computing and control unit of the agricultural machine furnishing assistance by providing a recommended path.

11. The method according to claim 10, further comprising taking into account, during execution under control of the maneuver according to a computed and optimized set path, the data furnished by different sensors mounted on at least one of the tractor, the agricultural machine, or the articulated linkage.

12. The method according to claim 10, further comprising taking into account, during execution under control of the maneuver in accordance with a computed and optimized set path, data furnished by a geolocating system including an antenna mounted on the agricultural machine or on the tractor, and if necessary recording differences from the recommended set path and displaying the differences and computing compensating actions and at least one of indicating the compensating actions to the driver or automatically executing the compensating actions.

13. The method according to claim 9, further comprising, in automatic mode of management of a maneuver, taking into account data furnished by at least one geolocation antenna installed on at least one of the tractor or the agricultural machine.

14. The method according to claim 13, further comprising assigning parameters to the path-optimizing algorithm by entering desired optimization objectives including at least one of minimization of working time, minimization of a distance traveled by one of the components of the hitch during the maneuver or minimization of at least one geometric dimension characterizing a maneuvering space.

15. The method according to claim 13, further comprising assigning parameters to the path-optimizing algorithm, in a case of management of half-turns, by the indication of execution constraints including at least one of imposition of an entrance point or of an exit point in a zone of working, or imposition of a maximum permitted width of a headland corresponding to a specified multiple of a working width of a broadest agricultural machine of the hitch.

16. The method according to claim 13, further comprising executing the maneuver by transmission of instructions to a power control interface of the tractor.

17. The method according to claim 9, further comprising taking into account, at the articulated linkage, a degree of freedom in which the articulated linkage pivots around an axis of rotation that is at least one of vertical or perpendicular to the soil, the sensor furnishing a signal indicative of a configuration of the articulated linkage around the axis of rotation.

* * * * *